(12) United States Patent
Egilmez et al.

(10) Patent No.: US 11,240,534 B2
(45) Date of Patent: Feb. 1, 2022

(54) EXTENDED MULTIPLE TRANSFORM SELECTION FOR VIDEO CODING

(71) Applicant: QUALCOMM Incorporated, San Diego, CA (US)

(72) Inventors: Hilmi Enes Egilmez, San Diego, CA (US); Vadim Seregin, San Diego, CA (US); Amir Said, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/838,553

(22) Filed: Apr. 2, 2020

(65) Prior Publication Data

US 2020/0322636 A1 Oct. 8, 2020

Related U.S. Application Data

(60) Provisional application No. 62/830,125, filed on Apr. 5, 2019, provisional application No. 62/855,398, filed on May 31, 2019.

(51) Int. Cl.
*H04N 19/61* (2014.01)
*H04N 19/176* (2014.01)
*H04N 19/625* (2014.01)

(52) U.S. Cl.
CPC ......... *H04N 19/625* (2014.11); *H04N 19/176* (2014.11); *H04N 19/61* (2014.11)

(58) Field of Classification Search
CPC .................................................. H04N 19/625
See application file for complete search history.

(56) References Cited

U.S. PATENT DOCUMENTS 8,063,801 B2 * 11/2011 Korodi ................... H03M 7/40
341/107
8,638,246 B2 * 1/2014 Korodi ................... H03M 7/40
341/107

(Continued)

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

(Continued)

*Primary Examiner* — Irfan Habib
(74) *Attorney, Agent, or Firm* — Shumaker & Sieffert, P.A.

(57) ABSTRACT

An example device for coding video data includes a memory configured to store video data; and one or more processors implemented in circuitry and configured to: code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block. The second codeword may be a value for a low-frequency non-separable transform (LFNST) syntax element.

39 Claims, 17 Drawing Sheets

(56) References Cited

U.S. PATENT DOCUMENTS

| | | | |
|---|---|---|---|
| 10,306,229 B2 | 5/2019 | Zhao et al. | |
| 10,349,085 B2 | 7/2019 | Said et al. | |
| 10,448,053 B2* | 10/2019 | Said | H04N 19/60 |
| 10,491,922 B2 | 11/2019 | Zhao et al. | |
| 10,681,379 B2 | 6/2020 | Zhao et al. | |
| 2011/0291867 A1* | 12/2011 | Korodi | H03M 7/40 |
| | | | 341/107 |
| 2012/0008675 A1* | 1/2012 | Karczewicz | H04N 19/61 |
| | | | 375/240.02 |
| 2012/0134412 A1* | 5/2012 | Shibahara | H04N 19/124 |
| | | | 375/240.03 |
| 2014/0247871 A1* | 9/2014 | Merkle | H04N 19/593 |
| | | | 375/240.12 |
| 2016/0219290 A1* | 7/2016 | Zhao | H04N 19/60 |
| 2017/0094314 A1* | 3/2017 | Zhao | H04N 19/122 |
| 2018/0020218 A1 | 1/2018 | Zhao et al. | |
| 2018/0103252 A1 | 4/2018 | Hsieh et al. | |
| 2019/0297351 A1 | 9/2019 | Said et al. | |
| 2019/0373261 A1* | 12/2019 | Egilmez | H04N 19/46 |
| 2020/0288121 A1* | 9/2020 | Zhao | H04N 19/136 |
| 2020/0322623 A1* | 10/2020 | Chiang | H04N 19/159 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Non-CE8: Unified Transform Type Signalling and Residual Coding for Transform Skip", Joint Video Experts Team (JVET) of ITU-T SG 16 WP 3 and ISO/IEC JTC 1/SC 29/WG 11, JVET-M0464-v4, 13th Meeting, Jan. 9-18, 2019, 13 pages.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 386 Pages.

Bross B., et al., "Versatile Video Coding (Draft 5)", Joint Video Experts Team (JVET) of ITU-T SG 16 WP 3 and ISO/IEC JTC 1/Sc 29/WG 11, JVET-N1001-v5, 14th Meeting: Geneva, CH, Mar. 19-27, 2019, 374 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29WG11 and ITU-T SG.16 ); URL: http://phenix.int-evry.fr/jvet/ ,, No. JVET-A1001 Feb. 24, 2016 (Feb. 24, 2016), XP030150000, 27 pages.

Egilmez H.E, et al., "Non-CE6: An MTS-based Restriction for LFNST beyond Transform Skip", Joint Video Experts Team (JVET) of ITU-T SG 16 WP 3 and ISO/IEC JTC 1/SC 29/WG 11, JVET-O0368-v4, 15th Meeting: Gothenburg, SE, Jul. 3-12, 2019, 7 pages.

Han J., et al., "Towards jointly optimal spatial prediction and adaptive transform in video/image coding," IEEE International Conference on Acoustics, Speech and Signal Processing (ICASSP), pp. 726-729 (Mar. 2010).

"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of Audiovisual Services—Coding of Moving Video, High Efficiency Video Coding, The International Telecommunication Union, Dec. 2016, 664 Pages.

Jain A.K., "A Sinusoidal Family of Unitary Transforms", IEEE Transactions on Pattern Analysis and Machine Intelligence, Oct. 1, 1979, pp. 356-365, IEEE Service Center, XP011242370, ISSN: 0162-8828.

Koo M., et al., "CE6: Reduced Secondary Transform (RST) (CE6-3.1)", JVET-N0193-r3, Joint Video Experts Team (JVET) of ITU-T SG 16 WP 3 and ISO/IEC JTC 1/SC 29/WG 11, JVET-N0193, 14th Meeting: Geneva, CH, Mar. 19-27, 2019, 19 pages.

Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].

Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.

Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, 14 pages.

Siekmann M., et al., "CE6-2.1: Simplification of Low Frequency Non-Separable Transform", Joint Video Experts Team (JVET) of ITU-T SG 16 WP 3 and ISO/IEC JTC 1/SC 29/WG 11, JVET-O0094-r1, 15th Meeting: Gothenburg, SE, Jul. 3-12, 2019, 8 pages.

U.S. Appl. No. 62/668,105, filed May 7, 2018, 44 Pages (183188P1).
U.S. Appl. No. 62/799,410, filed Jan. 31, 2019, 34 Pages (191396P1).
U.S. Appl. No. 15/931,271, filed May 13, 2018, 54 Pages (1414-778US01/192919).

Wien M, "High Efficiency Video Coding, Coding Tools and specification", Chapter 5, 2015, pp. 133-160.

Zhao X., et al., "CE6: Summary Report on Transforms and Transform Signaling ", Joint Video Experts Team (JVET) of ITU-T SG 16 WP 3 and ISO/IEC JTC 1/SC 29/WG 11, Document: JVET-N0026-v2, 14th Meeting: Geneva, CH, Mar. 19-27, 2019, pp. 1-15.

Zhao X., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-M1026-v4, 13th Meeting: Marrakech, MA, Jan. 9-18, 2019, 9 pages.

Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.

Hong Z., et al., "Improve the Efficiency of Low Frequency Non-Separable Secondary Transform Based on Implicit Multiple Transform Selection", 2019 International Conference on Artificial Intelligence and Advanced Manufacturing (AIAM), IEEE, Oct. 16, 2019 (Oct. 16, 2019), pp. 148-151, XP033688375, DOI: 10.1109/AIAM48774.2019.00037, [retrieved on Jan. 6, 2020], the whole document.

International Search Report and Written Opinion—PCT/US2020/026620—ISAEPO—Jul. 6, 2020.

Zhao (TENCENT) X., et al., "CE6: Coupled Primary and Secondary Transform (Test 6.3.2)", 12. JVET Meeting, 20181003-20181012, MACAO, (The Joint Video Exploration Team of ISO/IEC JTC1/SC29/WG11 and ITU-T SG.16), No. JVET-L0288-r1, Oct. 2, 2018 (Oct. 2, 2018), XP030194312, 4 Pages, Retrieved from the Internet: URL: http://phenix.int-evry.fr/jvet/doc_end_user/documents/12_Macao/wg11/JVET-L0288-v2.zip JVET-L0288_ri.docx, [retrieved on Oct. 2, 2018], the whole document.

Zhao X., et al., "Coupled Primary and Secondary Transform for Next Generation Video Coding", 2018 IEEE Visual Communications and Image Processing (VCIP), IEEE, Dec. 9, 2018 (Dec. 9, 2018), 4 Pages, XP033541863, DOI: 10.1109/VCIP.2018.8698635, [retrieved on Apr. 24, 2019], the whole document.

Zhao X., et al., "Joint Separable and Non-Separable Transforms for Next-Generation Video Coding", IEEE Transactions on Image Processing., vol. 27, No. 5, May 1, 2018 (May 1, 2018), pp. 2514-2525, XP055688223, US, ISSN: 1057-7149, DOI: 10.1109/TIP.2018.2802202, the whole document.

Chen J., et al., "Algorithm Description of Joint Exploration Test Model 7 (JEM7)", JVET-G1001-V1, Joint Video Exploration Team

(56) References Cited

OTHER PUBLICATIONS (JVET) of ITU-T SG 16 WP3 and ISO/IEC JTC 1/SC 29/WG 11, No. N17055, 7th Meeting, Jul. 13, 2017-Jul. 21, 2017, Torino, Aug. 19, 2017 (Aug. 19, 2017), XP030150980, 48 Pages, pages i-iv, Retrieved from the Internet: URL: http://phenix.int-evry.fr/jvet/doc_end_user/documents/7_Torino/wg11/JVET-G0001-v1.zip, section 2.3.5.

* cited by examiner

W vertical transforms

H horizontal transforms

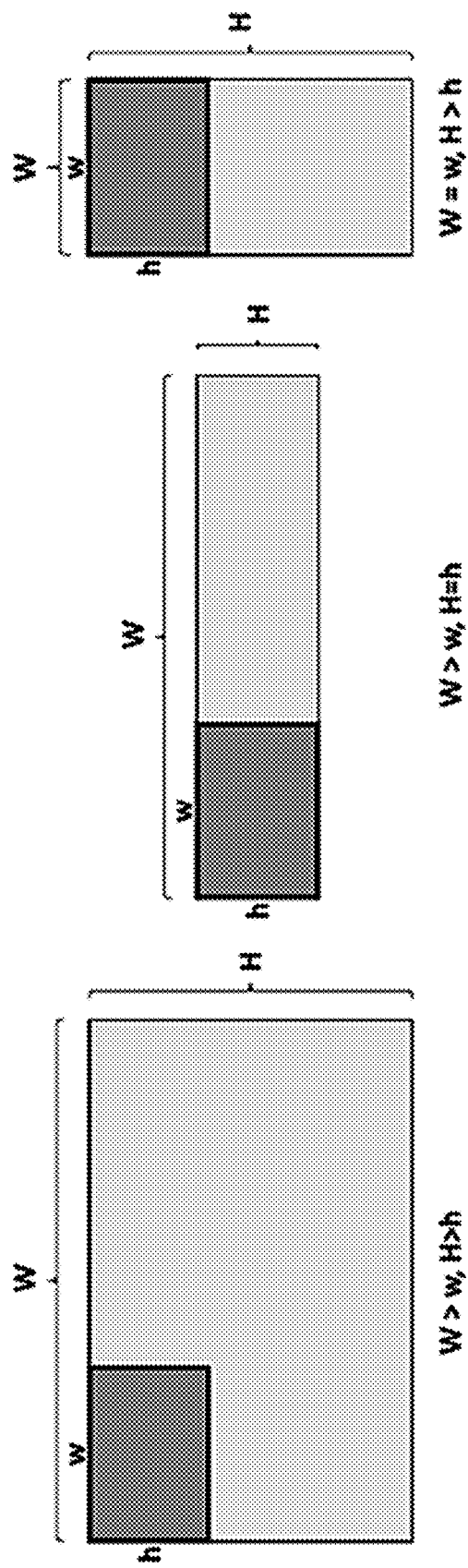
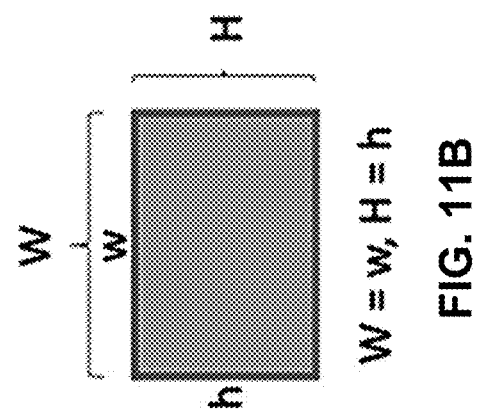
FIG. 11A
FIG. 11B

EXTENDED MULTIPLE TRANSFORM SELECTION FOR VIDEO CODING

This application claims the benefit of U.S. Provisional Application No. 62/830,125, filed Apr. 5, 2019, and U.S. Provisional Application No. 62/855,398, filed May 31, 2019, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to transform coding in video coding. Transform coding is an important element of modern video compression standards. This disclosure describes multiple transform selection (MTS) designs that extend other MTS tools, such as those of Versatile Video Coding (VVC)/ITU-T H.266. Since the designs described in this disclosure allow an encoder to choose a transform from more transform candidates, these techniques can improve coding efficiency. This disclosure also describes various simplified versions of Low-Frequency Non-separable Transformation (LFNST) that can reduce encoder and decoder complexity without significant degradation in coding efficiency. Thus, these techniques may be used in advanced video codecs and next generation video coding standards, such as VVC.

In one example, a method of coding (encoding or decoding) video data includes coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; coding a second codeword representing the secondary transform from the set of available secondary transforms; and applying the primary transform and the secondary transform during coding of residual data for the current block.

In another example, a device for coding video data includes a memory configured to store video data; and one or more processors implemented in circuitry and configured to: code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block.

In another example, a device for coding video data includes means for coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; means for coding a second codeword representing the secondary transform from the set of available secondary transforms; and means for applying the primary transform and the secondary transform during coding of residual data for the current block.

In another example, a computer-readable storage medium has stored thereon instructions that, when executed, cause a processor to code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block.

The details of one or more examples are set forth in the accompanying drawings and the description below. Other features, objects, and advantages will be apparent from the description and drawings, and from the claims.

BRIEF DESCRIPTION OF DRAWINGS

FIGS. 11A and 11B are conceptual diagrams illustrating an example two-step LFNST process implementation.

DETAILED DESCRIPTION

Figure 1:
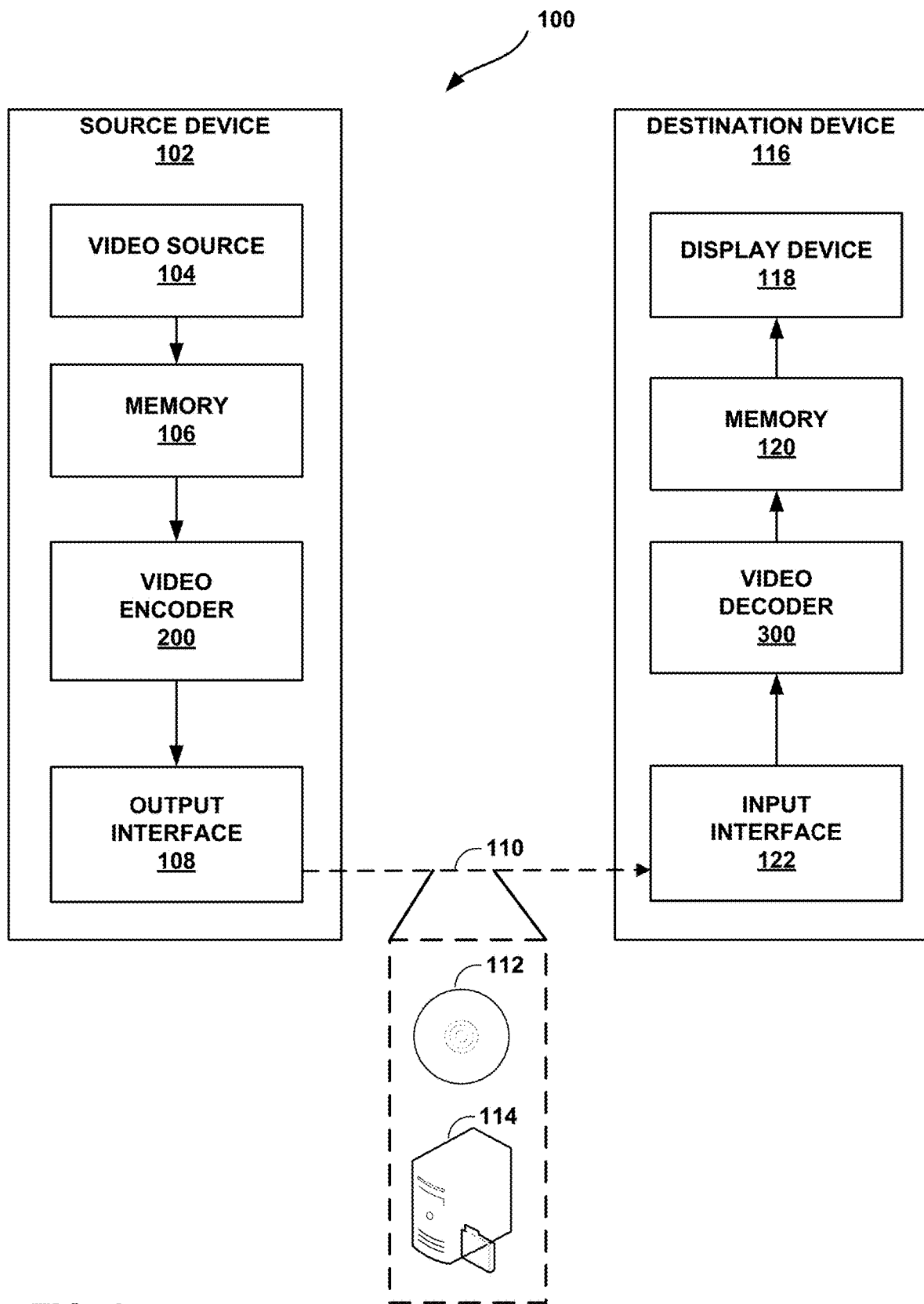
FIG. 1 is a block diagram illustrating an example video encoding and decoding system that may perform the techniques of this disclosure.

This disclosure describes techniques related to transform coding, which is an important element of modern video compression standards, e.g., as discussed in M. Wien, High Efficiency Video Coding: Coding Tools and Specification, Springer-Verlag, Berlin, 2015. This disclosure describes extended multiple transform selection (MTS) techniques.

In general, video data is represented as a sequential series of pictures. A video coder partitions the pictures into blocks, and codes each of the blocks. Coding generally includes prediction and residual coding. During prediction, the video coder may form a prediction block using intra-prediction (in which the prediction block is formed from neighboring, previously coded blocks of the same picture) or inter-prediction (in which the prediction block is formed from previously coded blocks of previously coded pictures). A residual block represents pixel-by-pixel differences between the prediction block and an original, uncoded block. A video encoder may apply a transform to the residual block to produce a transform block including transform coefficients, whereas a video decoder may apply an inverse transform to the transform block to reproduce a version of the residual block.

Assume an input N-point vector is denoted as $x=[x_0, x_1, \ldots, x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulation, wherein k ranges from 0 through N−1, inclusive:

$$y_k = \Sigma_{n=0}^{N-1} \sqrt{\frac{2}{N-1}} \cos\left(\frac{\pi \cdot n \cdot k}{N-1}\right) \cdot w_0 \cdot w_1 \cdot x_n, \quad \text{DCT Type-I (DCT-1)}$$

$$\text{where } w_0 = \begin{cases} \frac{1}{\sqrt{2}}, & \text{if } n=0 \text{ or } n=N-1 \\ 1, & \text{otheriwse} \end{cases},$$

$$w_1 = \begin{cases} \frac{1}{\sqrt{2}}, & \text{if } k=0 \text{ or } k=N-1 \\ 1, & \text{otheriwse} \end{cases}$$

$$y_k = \qquad \text{DCT Type-II (DCT-2)}$$
$$\Sigma_{n=0}^{N-1} \sqrt{\frac{2}{N-1}} \cos\left(\frac{\pi \cdot (n+0.5) \cdot k}{N-1}\right) \cdot w_0 \cdot x_n,$$

$$\text{where } w_0 = \begin{cases} \frac{1}{\sqrt{2}}, & \text{if } k=0 \\ 1, & \text{otheriwse} \end{cases}$$

$$y_k = \Sigma_{n=0}^{N-1} \sqrt{\frac{2}{N}} \cos\left(\frac{\pi \cdot n \cdot (k+0.5)}{N}\right) \cdot w_0 \cdot x_n, \quad \text{DCT Type-III (DCT-3)}$$

$$\text{where } w_0 = \begin{cases} \frac{1}{\sqrt{2}}, & \text{if } n=0 \\ 1, & \text{otheriwse} \end{cases}$$

$$y_k = \Sigma_{n=0}^{N-1} \sqrt{\frac{2}{N}} \cos\left(\frac{\pi \cdot (n+0.5) \cdot (k+0.5)}{N}\right) \cdot x_n, \quad \text{DCT Type-IV (DCT-4)}$$

$$y_k = \qquad \text{DCT Type-V (DCT-5)}$$
$$\Sigma_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

$$\text{where } w_0 = \begin{cases} \frac{1}{\sqrt{2}}, & \text{if } n=0 \\ 1, & \text{otheriwse} \end{cases},$$

$$w_1 = \begin{cases} \frac{1}{\sqrt{2}}, & \text{if } k=0 \\ 1, & \text{otheriwse} \end{cases}$$

$$y_k = \Sigma_{n=0}^{N-1} \sqrt{\frac{2}{N-0.5}} \qquad \text{DCT Type-VI (DCT-6)}$$
$$\cos\left(\frac{\pi \cdot (n+0.5) \cdot k}{N-0.5}\right) \cdot w_0 \cdot w_1 \cdot x_n,$$

$$\text{where } w_0 = \begin{cases} \frac{1}{\sqrt{2}}, & \text{if } n=N-1 \\ 1, & \text{otheriwse} \end{cases},$$

$$w_1 = \begin{cases} \frac{1}{\sqrt{2}}, & \text{if } k=0 \\ 1, & \text{otheriwse} \end{cases}$$

-continued $$y_k = \Sigma_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$ DCT Type-VII (DCT-7)

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ $$y_k = \Sigma_{n=0}^{N-1} \sqrt{\frac{2}{N+0.5}} \cos\left(\frac{\pi \cdot (n+0.5) \cdot (k+0.5)}{N+0.5}\right) \cdot x_n,$$ DCT Type-VIII (DCT-8)

$$y_k = \Sigma_{n=0}^{N-1} \sqrt{\frac{2}{N+1}} \sin\left(\frac{\pi \cdot (n+1) \cdot (k+1)}{N+1}\right) \cdot x_n,$$ DST Type-I (DST-1)

$$y_k = \Sigma_{n=0}^{N-1} \sqrt{\frac{2}{N}} \sin\left(\frac{\pi \cdot (n+0.5) \cdot (k+1)}{N}\right) \cdot w_0 \cdot x_n,$$ DST Type-II (DST-2)

where $w_0 = \begin{cases} \frac{1}{\sqrt{2}}, & \text{if } k = N-1 \\ 1, & \text{otheriwse} \end{cases}$, $$y_k = \Sigma_{n=0}^{N-1} \sqrt{\frac{2}{N}} \sin\left(\frac{\pi \cdot (n+1) \cdot (k+0.5)}{N}\right) \cdot w_0 \cdot x_n,$$ DST Type-III (DST-3)

where $w_0 = \begin{cases} \frac{1}{\sqrt{2}}, & \text{if } k = N-1 \\ 1, & \text{otheriwse} \end{cases}$, $$y_k = \Sigma_{n=0}^{N-1} \sqrt{\frac{2}{N}} \sin\left(\frac{\pi \cdot (n+0.5) \cdot (k+0.5)}{N}\right) \cdot x_n,$$ DST Type-IV (DST-4)

$$y_k = \Sigma_{n=0}^{N-1} \sqrt{\frac{2}{N+0.5}} \sin\left(\frac{\pi \cdot (n+1) \cdot (k+1)}{N+0.5}\right) \cdot x_n,$$ DST Type-V (DST-5)

$$y_k = \Sigma_{n=0}^{N-1} \sqrt{\frac{2}{N+0.5}} \sin\left(\frac{\pi \cdot (n+0.5) \cdot (k+1)}{N+0.5}\right) \cdot x_n,$$ DST Type-VI (DST-6)

$$y_k = \Sigma_{n=0}^{N-1} \sqrt{\frac{2}{N+0.5}} \sin\left(\frac{\pi \cdot (n+1) \cdot (k+0.5)}{N+0.5}\right) \cdot x_n,$$ DST Type-VII (DST-7)

$$y_k = \Sigma_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$ DST Type-VIII (DST-8)

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function. For example, 4-point DST-VII and 8-point DST-VII have the same transform type, regardless the value of N.

Without loss of generality, all the above transform types can be represented using the below generalized formulation:

$$y_m = \Sigma_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that the above transform formulations, which are applied on the 1-D input data x, can be represented in matrix multiplication form as below $$y = Tx$$

where T indicates the transform matrix, x indicates the input data vector, and y indicates the output transform coefficients vector.

The transforms as introduced above are applied on 1-D input data, and transforms can be also extended for 2-D input data sources. Supposing X is an input M×N data array. The typical methods of applying transform on 2-D input data include separable and non-separable 2-D transforms.

A separable 2-D transform applies 1-D transforms for the horizontal and vertical vectors of X sequentially, formulated as below:

$$Y = C \cdot X \cdot R^T$$

where C and R denote the given M×M and N×N transform matrices, respectively. From the formulation, it can be seen that C applies 1-D transforms for the column vectors of X, while R applies 1-D transforms for the row vectors of X. In the later part of this disclosure, for simplicity, C and R can denote left (vertical) and right (horizontal) transforms and can be considered to form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N+j)} = X_{i,j}$$

Then a 1-D transform T' is applied for X' as below:

$$Y = T' \cdot X$$

where T' is an (M*N)×(M*N) transform matrix.

In video coding, separable 2-D transforms are generally applied, because separable 2-D transforms typically require fewer operation (addition and multiplication) counts compared to 1-D transforms.

In conventional video codecs, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proven and experimentally validated (in J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729) that DST Type-VII is more efficient than DCT Type-II for residuals vectors generated along the Intra prediction directions. For example, DST Type-VII is more efficient than DCT Type-II for row residual vectors generated by the horizontal Intra prediction direction. In HEVC, an integer approximation of 4-point DST Type-VII is applied only for 4×4 luma Intra prediction residual blocks. The 4-point DST-VII used in HEVC is shown below,

4×4 DST-VII:
{29, 55, 74, 84}
{74, 74, 0,−74}
{84,−29,−74, 55}
{55,−84, 74,−29}

In HEVC, for residual blocks that are not 4×4 luma Intra prediction residual blocks, integer approximations of the 4-point, 8-point, 16-point and 32-point DCT Type-II are also applied, as shown below:

4-Point DCT-II:
{64, 64, 64, 64}
{83, 36,−36,−83}
{64,−64,−64, 64}
{36,−83, 83,−36}

8-Point DCT-II:
{64, 64, 64, 64, 64, 64, 64, 64}
{89, 75, 50, 18,−18,−50,−75,−89}
{83, 36,−36,−83,−83,−36, 36, 83}
{75,−18,−89,−50, 50, 89, 18,−75}
{64,−64,−64, 64, 64,−64,−64, 64}
{50,−89, 18, 75,−75,−18, 89,−50}
{36,−83, 83,−36,−36, 83,−83, 36}
{18,−50, 75,−89, 89,−75, 50,−18}

16-Point DCT-II:
{64, 64, 64, 64, 64, 64, 64, 64, 64, 64, 64, 64, 64, 64, 64, 64}
{90, 87, 80, 70, 57, 43, 25, 9, −9,−25,−43,−57,−70,−80,−87,−90}
{89, 75, 50, 18,−18,−50,−75,−89,−89,−75,−50,−18, 18, 50, 75, 89}
{87, 57, 9,−43,−80,−90,−70,−25, 25, 70, 90, 80, 43, −9,−57,−87}
{83, 36,−36,−83,−83,−36, 36, 83, 83, 36,−36,−83,−83,−36, 36, 83}
{80, 9,−70,−87,−25, 57, 90, 43,−43,−90,−57, 25, 87, 70, −9,−80}
{75,−18,−89,−50, 50, 89, 18,−75,−75, 18, 89, 50,−50,−89,−18, 75}
{70,−43,−87, 9, 90, 25,−80,−57, 57, 80,−25,−90, −9, 87, 43,−70}
{64,−64,−64, 64, 64,−64,−64, 64, 64,−64,−64, 64, 64,−64,−64, 64}
{57,−80,−25, 90, −9,−87, 43, 70,−70,−43, 87, 9,−90, 25, 80,−57}
{50,−89, 18, 75,−75,−18, 89,−50,−50, 89,−18,−75, 75, 18,−89, 50}
{43,−90, 57, 25,−87, 70, 9,−80, 80, −9,−70, 87,−25,−57, 90,−43}
{36,−83, 83,−36,−36, 83,−83, 36, 36,−83, 83,−36,−36, 83,−83, 36}
{25,−70, 90,−80, 43, 9,−57, 87,−87, 57, −9,−43, 80,−90, 70,−25}
{18,−50, 75,−89, 89,−75, 50,−18,−18, 50,−75, 89,−89, 75,−50, 18}
{9, −25, 43,−57, 70,−80, 87,−90, 90,−87, 80,−70, 57,−43, 25, −9}

32-Point DCT-II:
{64,64,64,64,64,64,64,64,64,64,64,64,64,64,64,64,64,64,64,64,64,64,64,64,64,64,64,64,64,64,64,64}
{90,90,88,85,82,78,73,67,61,54,46,38,31,22,13,4,−4,−13,−22,−31,−38,−46,−54,−61,−67,−73,−78,−82,−85,−88,−90,−90}
{90,87,80,70,57,43,25,9,−9,−25,−43,−57,−70,−80,−87,−90,−90,−87,−80,−70,−57,−43,−25,−9,9,25,43,57,70,80,87,90}
{90,82,67,46,22,−4,−31,−54,−73,−85,−90,−88,−78,−61,−38,−13,13,38,61,78,88,90,85,73,54,31,4,−22,−46,−67,−82,−90}
{89,75,50,18,−18,−50,−75,−89,−89,−75,−50,−18,18,50,75,89,89,75,50,18,−18,−50,−75,−89,−89,−75,−50,−18,18,50,75,89}
{88,67,31,−13,−54,−82,−90,−78,−46,−4,38,73,90,85,61,22,−22,−61,−85,−90,−73,−38,4,46,78,90,82,54,13,−31,−67,−88}
{87,57,9,−43,−80,−90,−70,−25,25,70,90,80,43,−9,−57,−87,−87,−57,−9,43,80,90,70,25,−25,−70,−90,−80,−43,9,57,87}
{85,46,−13,−67,−90,−73,−22,38,82,88,54,−4,−61,−90,−78,−31,31,78,90,61,4,−54,−88,−82,−38,22,73,90,67,13,−46,−85}
{83,36,−36,−83,−83,−36,36,83,83,36,−36,−83,−83,−36,36,83,83,36,−36,−83,−83,−36,36,83,83,36,−36,−83,−83,−36,36,83}
{82,22,−54,−90,−61,13,78,85,31,−46,−90,−67,4,73,88,38,−38,−88,−73,−4,67,90,46,−31,−85,−78,−13,61,90,54,−22,−82}
{80,9,−70,−87,−25,57,90,43,−43,−90,−57,25,87,70,−9,−80,−80,−9,70,87,25,−57,−90,−43,43,90,57,−25,−87,−70,9,80}
{78,−4,−82,−73,13,85,67,−22,−88,−61,31,90,54,−38,−90,−46,46,90,38,−54,−90,−31,61,88,22,−67,−85,−13,73,82,4,−78}
{75,−18,−89,−50,50,89,18,−75,−75,18,89,50,−50,−89,−18,75,75,−18,−89,−50,50,89,18,−75,−75,18,89,50,−50,−89,−18,75}
{73,−31,−90,−22,78,67,−38,−90,−13,82,61,−46,−88,−4,85,54,−54,−85,4,88,46,−61,−82,13,90,38,−67,−78,22,90,31,−73}
{70,−43,−87,9,90,25,−80,−57,57,80,−25,−90,−9,87,43,−70,−70,43,87,−9,−90,−25,80,57,−57,−80,25,90,9,−87,−43,70}
{67,−54,−78,38,85,−22,−90,4,90,13,−88,−31,82,46,−73,−61,61,73,−46,−82,31,88,−13,−90,−4,90,22,−85,−38,78,54,−67}
{64,−64,−64,64,64,−64,−64,64,64,−64,−64,64,64,−64,−64,64,64,−64,−64,64,64,−64,−64,64,64,−64,−64,64,64,−64,−64,64}
{61,−73,−46,82,31,−88,−13,90,−4,−90,22,85,−38,−78,54,67,−67,−54,78,38,−85,−22,90,4,−90,13,88,−31,−82,46,73,−61}
{57,−80,−25,90,−9,−87,43,70,−70,−43,87,9,−90,25,80,−57,−57,80,25,−90,9,87,−43,−70,70,43,−87,−9,90,−25,−80,57}
{54,−85,−4,88,−46,−61,82,13,−90,38,67,−78,−22,90,−31,−73,73,31,−90,22,78,−67,−38,90,−13,−82,61,46,−88,4,85,−54}
{50,−89,18,75,−75,−18,89,−50,−50,89,−18,−75,75,18,−89,50,50,−89,18,75,−75,−18,89,−50,−50,89,−18,−75,75,18,−89,50}
{46,−90,38,54,−90,31,61,−88,22,67,−85,13,73,−82,4,78,−78,−4,82,−73,−13,85,−67,−22,88,−61,−31,90,−54,−38,90,−46}
{43,−90,57,25,−87,70,9,−80,80,−9,−70,87,−25,−57,90,−43,−43,90,−57,−25,87,−70,−9,80,−80,9,70,−87,25,57,−90,43}

{38,−88,73,−4,−67,90,−46,−31,85,−78,13,61,−90,54,
22,−82,82,−22,−54,90,−61,−13,78,−85,31,46,−90,67,
4,−73,88,−38}
{36,−83,83,−36,−36,83,−83,36,36,−83,83,−36,−36,83,−
83,36,36,−83,83,−36,−36,83,−83,36,36,−83,83,−36,−
36,83,−83,36}
{31,−78,90,−61,4,54,−88,82,−38,−22,73,−90,67,−13,−
46,85,−85,46,13,−67,90,−73,22,38,−82,88,−54,−4,
61,−90,78,−31}
{25,−70,90,−80,43,9,−57,87,−87,57,−9,−43,80,−90,70,−
25,−25,70,−90,80,−43,−9,57,−87,87,−57,9,43,−80,
90,−70,25}
{22,−61,85,−90,73,−38,−4,46,−78,90,−82,54,−13,−31,
67,−88,88,−67,31,13,−54,82,−90,78,−46,4,38,−73,
90,−85,61,−22}
{18,−50,75,−89,89,−75,50,−18,−18,50,−75,89,−89,75,−
50,18,18,−50,75,−89,89,−75,50,−18,−18,50,−75,89,−
89,75,−50,18}
{13,−38,61,−78,88,−90,85,−73,54,−31,4,22,−46,67,−82,
90,−90,82,−67,46,−22,−4,31,−54,73,−85,90,−88,78,−
61,38,−13}
{9,−25,43,−57,70,−80,87,−90,90,−87,80,−70,57,−43,
25,−9,−9,25,−43,57,−70,80,−87,90,−90,87,−80,70,−
57,43,−25,9}
{4,−13,22,−31,38,−46,54,−61,67,−73,78,−82,85,−88,
90,−90,90,−90,88,−85,82,−78,73,−67,61,−54,46,−38,
31,−22,13,−4}

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding MTS data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding MTS data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream of computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the upcoming Versatile Video Coding (VVC) standard, which is planned to become ITU-T H.266. A working draft of VVC is Bross et al., "Versatile Video Coding (Draft 5)" Joint Video Experts Team (JVET) of ITU-T SG 16 WP 3 and ISO/IEC JTC 1/SC 29/WG 11, 14th Meeting, Geneva, CH, 19-27 Mar. 2019, document JVET-N1001-v5. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of VVC removes the concepts of multiple partition types, such as the separation between CUs, PUs, and TUs of HEVC. A QTBT structure of VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

In accordance with the techniques of this disclosure, video encoder 200 may determine a particular type of transform (or multiple transform) to apply to a residual block for a current block. The determined type of transform may include a primary transform, which may be a separable transform including a horizontal transform and a vertical transform. In some examples, the determined type of transform may further include a secondary transform (e.g., a nonseparable transform). Video encoder 200 may encode a first codeword representing the selected type of transform, which represents the primary transform and whether or not the selected type of transform includes a secondary transform. In the case that the first codeword indicates that the selected type of transform includes the secondary transform, video encoder 200 may further encode a second codeword representing a selected secondary transform of a set of available secondary transforms. Furthermore, video encoder 200 may apply both the primary transform and the secondary transform. Examples of such combinations of codewords are explained in greater detail below with respect to Tables 1-12 and FIGS. 6-8.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block.

In accordance with the techniques of this disclosure, video decoder 300 may decode a first codeword representing a type of transform to be applied to decoded transform coefficients for a current block of video data. As discussed above, the type of transform may represent a primary transform, which may be a separable transform including a horizontal transform and a vertical transform. The type of transform may further include a secondary transform. If the type of transform includes the secondary transform, video decoder 300 may decode a second codeword representing the secondary transform, which may be included in a set of available secondary transforms. Video decoder 300 may then apply the secondary transform to the decoded transform coefficients to produce an intermediate set of transform coefficients, then apply the primary transform to the intermediate set of transform coefficients to reproduce a residual block for the current block.

Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." In addition, video encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1.

The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then inverse binarize the bins to recover the value of the syntax element.

In video coding standards prior to HEVC, only a fixed separable transform is used where DCT-2 is used both vertically and horizontally. In HEVC, in addition to DCT-2, DST-7 is also employed for 4×4 blocks as a fixed separable transform.

U.S. Pat. No. 10,306,229, U.S. Patent Publication 2018/0020218, and U.S. Provisional Patent application 62/679,570 describe multiple transform selection (MTS) techniques. MTS was previously called Adaptive Multiple Transforms (AMT). An example of MTS in U.S. Provisional Patent application 62/679,570 has been adopted in the Joint Experimental Model (JEM-7.0) of the Joint Video Experts Team (JVET), and later a simplified version of MTS is adopted in VVC.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
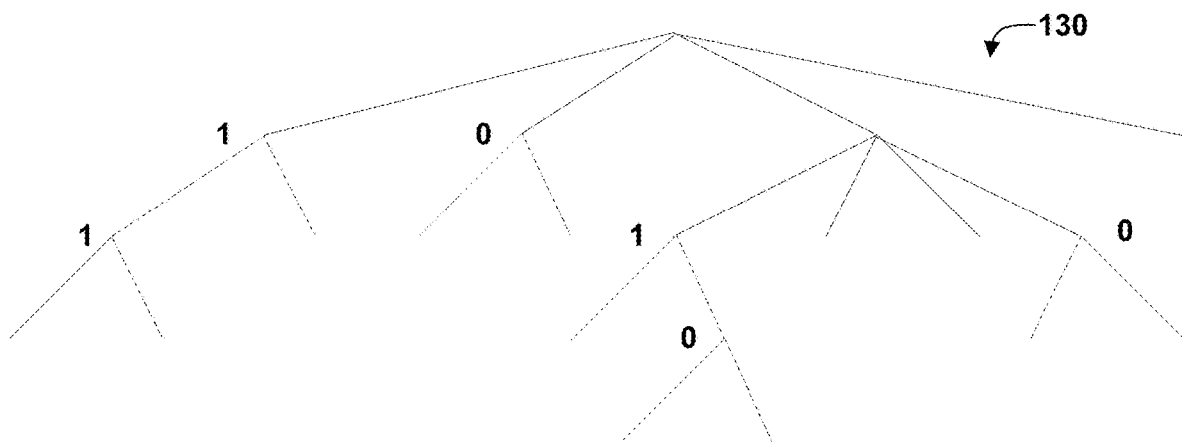
FIGS. 2A and 2B are conceptual diagrams illustrating an example quadtree binary tree (QTBT) structure, and a corresponding coding tree unit (CTU).
Figure 2B:
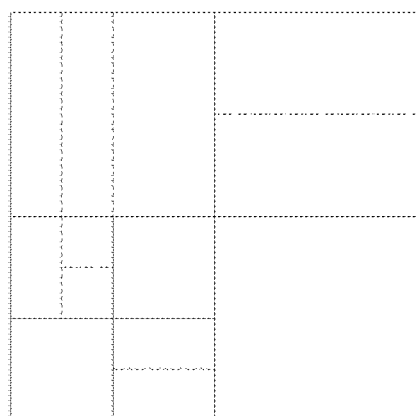

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. Nodes of the first level that are not larger than the maximum allowed binary tree root node size (MaxBTSize) can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3B:
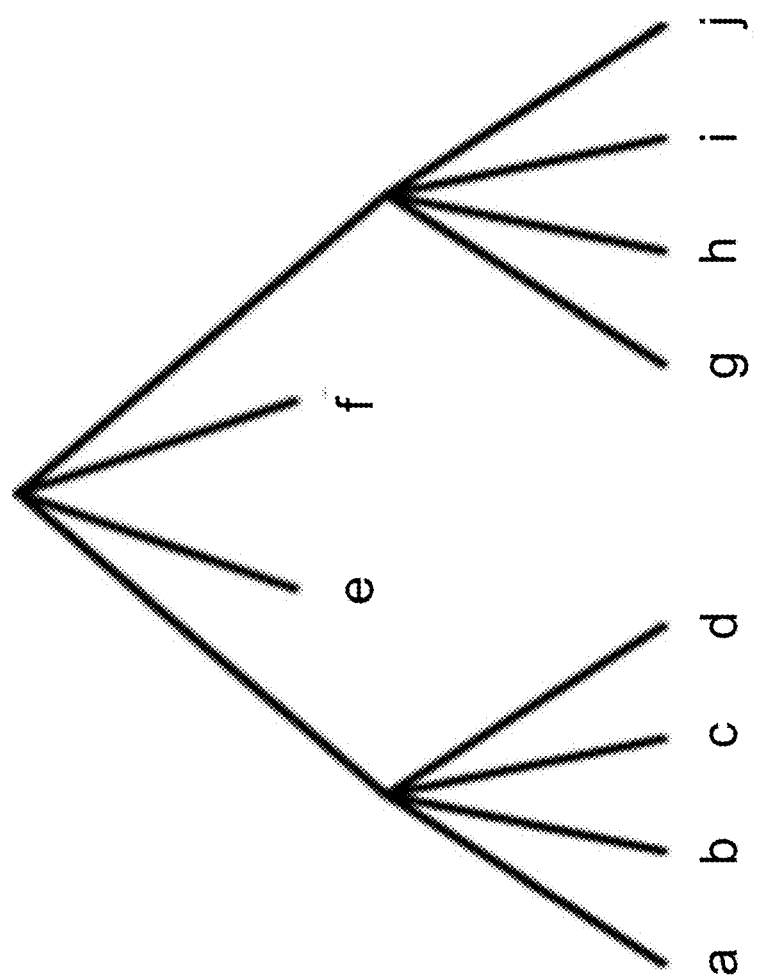
FIGS. 3A and 3B are conceptual diagrams illustrating an example transform scheme based on a residual quadtree of High Efficiency Video Coding (HEVC).
Figure 3A:
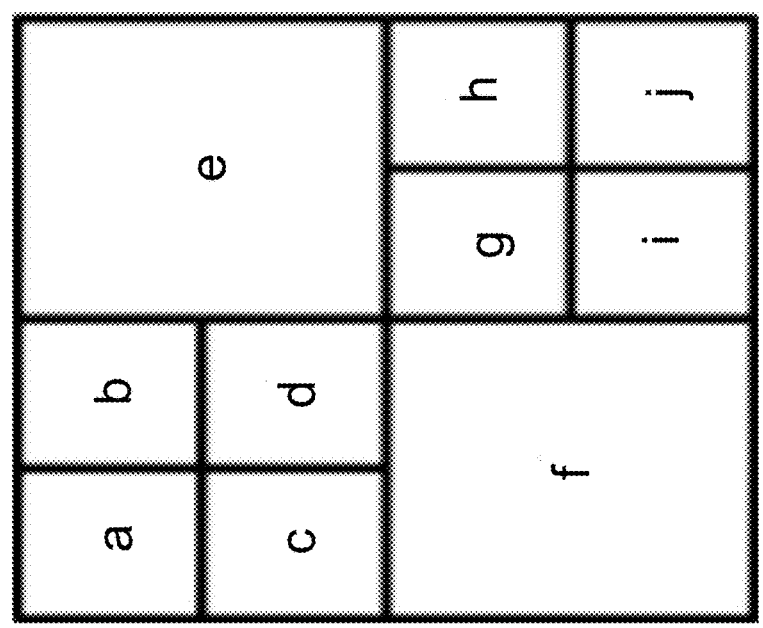

FIGS. 3A and 3B are conceptual diagrams illustrating an example transform scheme based on a residual quadtree of HEVC. In HEVC, a transform coding structure using the residual quadtree (RQT) is applied to adapt various characteristics of residual blocks, which is briefly described as follows, adapted from www.hhi.fraunhofer.de/fields-of-competence/image-processing/research-groups/image-video-coding/hevc-high-efficiency-video-coding/transform-coding-using-the-residual-quadtree-rqt.html.

In HEVC, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs).

After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

FIG. 3A depicts an example where a CU includes 10 TUs, labeled with the letters a to j, and the corresponding block partitioning. Each node of the RQT shown in FIG. 3B is actually a transform unit (TU) corresponding to FIG. 3A. The individual TUs are processed in depth-first tree traversal order, which is illustrated in FIG. 3A as alphabetical order, which follows a recursive Z-scan with depth-first traversal. The quadtree approach enables the adaptation of the transform to the varying space-frequency characteristics of the residual signal.

Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT per HEVC: the maximum depth of the tree, the minimum allowed transform size and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB cannot be split any further if each included TB reaches the maximum allowed transform size, e.g., 32×32.

All these parameters interact and influence the RQT structure in HEVC. Consider a case in which the root CB size is 64×64, the maximum depth is equal to zero, and the maximum transform size is equal to 32×32. In this case, the CB has to be partitioned at least once, since otherwise it would lead to a 64×64 TB, which is not allowed. The RQT parameters, i.e., maximum RQT depth, minimum and maximum transform size, are transmitted in the bitstream at the sequence parameter set level, per HEVC. Regarding the RQT depth, different values can be specified and signaled for intra and inter coded CUs.

The quadtree transform is applied for both Intra and Inter residual blocks in HEVC. Typically, the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform, are not adopted, mainly due to their limited benefit considering the relatively high complexity for relatively smaller resolution videos.

Figure 4:
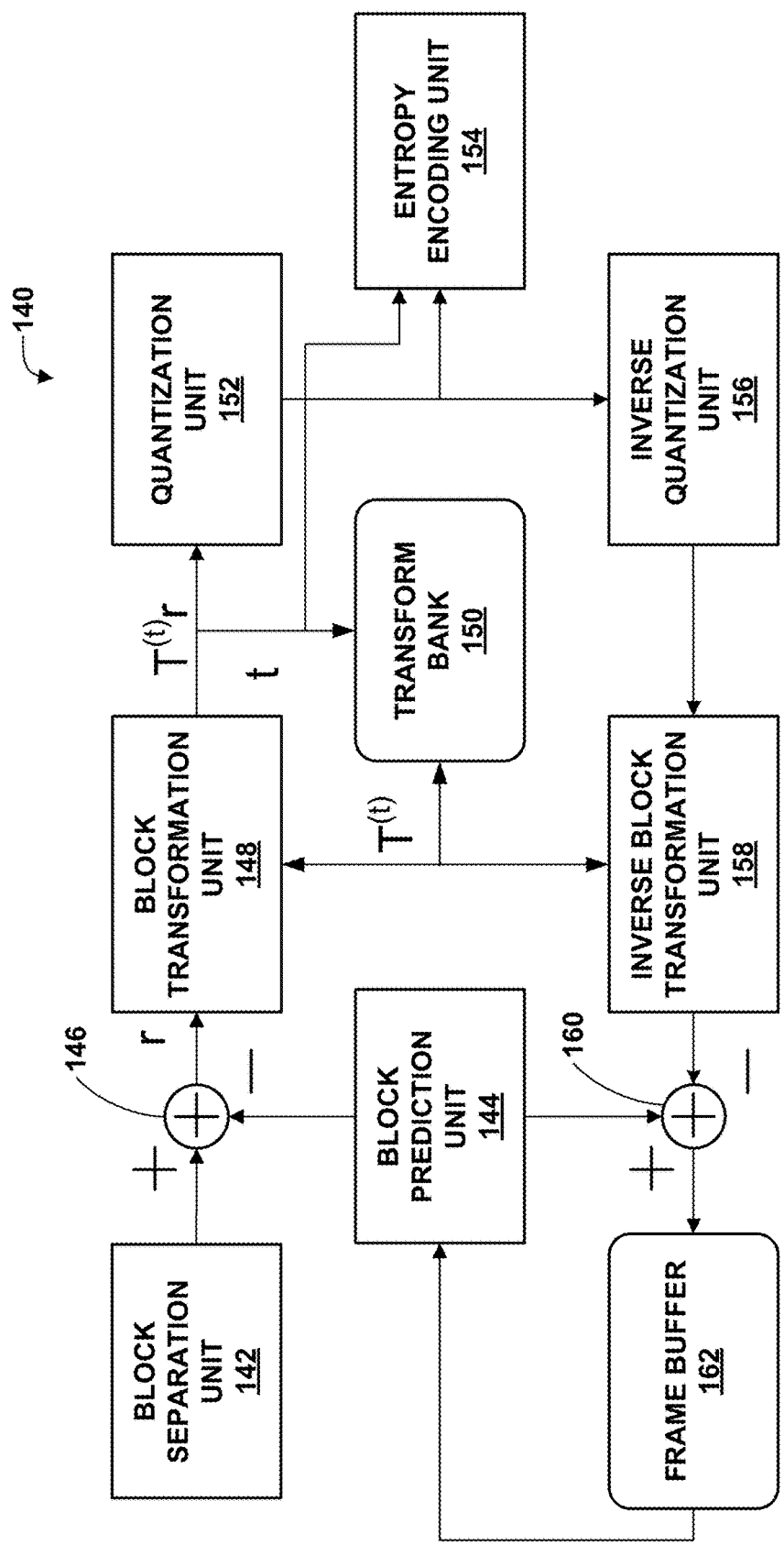
FIG. 4 is a block diagram illustrating an example system for hybrid video encoding with adaptive transform selection.

FIG. 4 is a block diagram illustrating an example system 140 for hybrid video encoding with adaptive transform selection. The techniques of this disclosure may be performed by such a system, or a corresponding decoding system. In general, the techniques of this disclosure are applicable to an adaptive transform coding scheme, where for each block of prediction residuals, different transforms can be selected by a video encoder, signaled as side information, and determined by a video decoder using the side information.

System 140 of FIG. 4 includes block separation unit 142, block prediction unit 144, residual generation unit 146, block transformation unit 148, transform bank 150, quantization unit 152, entropy encoding unit 154, inverse quantization unit 156, inverse block transformation unit 158, block reconstruction unit 160, and frame buffer 162. Block separation unit 142 generally receives raw, uncoded video data and partitions pictures of the video data into blocks. Block prediction unit 144 generates a prediction block for a current block of video data to be encoded. Block separation unit 142 provides the current block to residual generation unit 146 and block prediction unit 144 provides the prediction block to residual generation unit 146. Residual generation unit 146 generates a residual block (r) and provides the residual block to block transformation unit 148.

Block transformation unit 148 selects one or more transforms from transform bank 150. For example, according to the techniques of this disclosure, transform bank 150 may include one or more primary transforms (e.g., separable transforms) and one or more secondary transforms (e.g., non-separable transforms). Block transformation unit 148 may then apply the primary and, if applicable, the secondary transform to generate transform coefficients. Furthermore, block transformation unit 148 may send an indication (t) of the transform(s) to entropy encoding unit 154. Block transformation unit 148 provides the transform coefficients ($T^{(t)}r$) to quantization unit 152.

Quantization unit 152 quantizes the transform coefficients, e.g., by reducing bit depth of the transform coefficients according to a quantization parameter (QP) for the current block. Quantization unit 152 provides the quantized transform coefficients to entropy encoding unit 154 and inverse quantization unit 156.

Entropy encoding unit 154 performs entropy encoding of values for syntax elements, including the indications of transforms (t) and quantized transform coefficients. In accordance with the techniques of this disclosure, entropy encoding unit 154 may encode a first codeword representing a selected transform scheme of a set of transform candidates of a multiple transform selection (MTS) scheme for a current block of video data. The selected transform scheme may include a primary transform and, in some examples, a secondary transform to be applied in addition to the primary transform. In the case the selected transform scheme includes the secondary transform, entropy encoding unit 154 may encode a second codeword representing the secondary transform in a set of available secondary transforms. Entropy encoding unit 154 may include the entropy encoded data (e.g., the first and/or second codewords and entropy encoded syntax elements for the quantized transform coefficients) in an encoded video bitstream.

Inverse quantization unit 156 may inverse quantize the quantized transform coefficients and pass the resulting transform coefficients to inverse block transformation unit 158. Inverse block transformation unit 158 may apply the primary transform and, if applicable, the secondary transform to the transform coefficients to reproduce the residual block. Inverse block transformation unit 158 may provide the residual block to block reconstruction unit 160, which may combine the residual block with the prediction block to produce a reconstructed block, and store the reconstructed block in frame buffer 162. Frame buffer 162 may also be referred to as a decoded picture buffer (DPB).

Each of the various components of FIG. 4 may be implemented in hardware, software, firmware, or a combination thereof. When implemented in software or firmware, instructions for the various operations may be stored in a memory and executed by one or more processing units. The processing units and memory may be implemented in circuitry. The processing units may include, for example, one or more digital signal processors (DSPs), general purpose microprocessors, application specific integrated circuits (ASICs), field programmable gate arrays (FPGAs), or other equivalent integrated or discrete logic circuitry, in any combination.

In this manner, system 140 of FIG. 4 represents an example of a video encoder including a memory configured to store video data; and one or more processors implemented in circuitry and configured to: code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block.

Figure 5B:
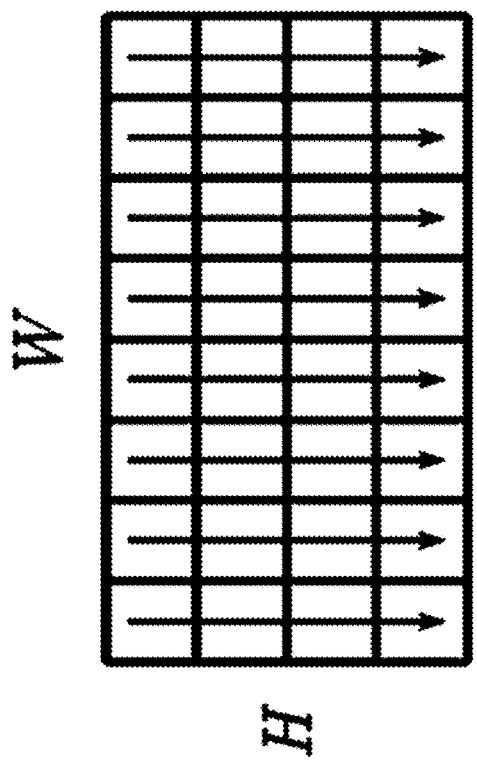
FIGS. 5A and 5B are conceptual diagrams illustrating horizontal and vertical transforms as a separate transform implementation.
Figure 5A:
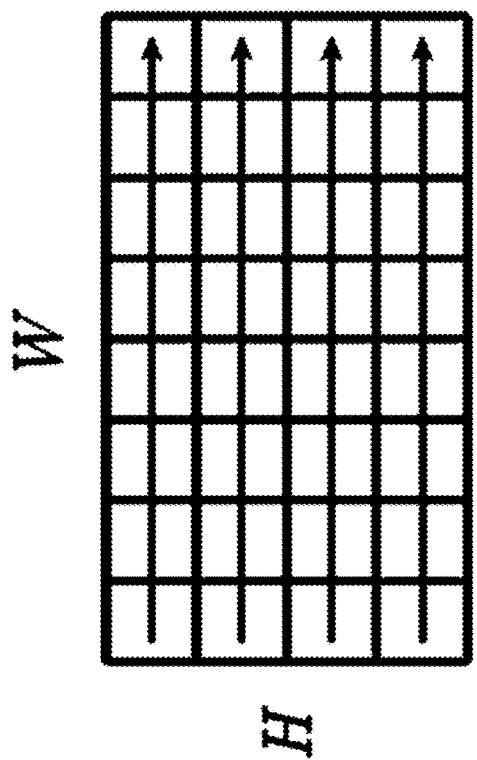

FIGS. 5A and 5B are conceptual diagrams illustrating horizontal and vertical transforms as a separate transform implementation. In particular, horizontal and vertical lines of residual values may be transformed independently using the horizontal and vertical transforms (e.g., to reduce computational complexity, the block transforms may be computed in a separable manner).

In video coding standards prior to HEVC, only a fixed separable transform is used where DCT-2 is used both vertically and horizontally. In HEVC, in addition to DCT-2, DST-7 is also employed for 4×4 blocks as a fixed separable transform. U.S. patent application Ser. Nos. 15/005,736 and 15/649,612 describe adaptive extensions of those fixed transforms, and an example of MTS (also referred to as adaptive multiple transforms (AMT)) is described in U.S. patent application Ser. No. 15/005,736, filed Jan. 25, 2016; Ser. Nos. 15/649,612, filed Jul. 13, 2017; and 62/679,570 filed Jun. 1, 2018 has been adopted in the Joint Experimental Model (JEM) of the Joint Video Experts Team (JVET) (Joint Video Experts Team (JVET) of ITU-T SG 16 WP 3 and ISO/IEC JTC 1/SC 29/WG 11, JEM Software, available at jvet.hhi.fraunhofer.de/svn/svn_HMJEMSoftware/tags/HM-16.6-JEM-7.0.).

Figure 6:
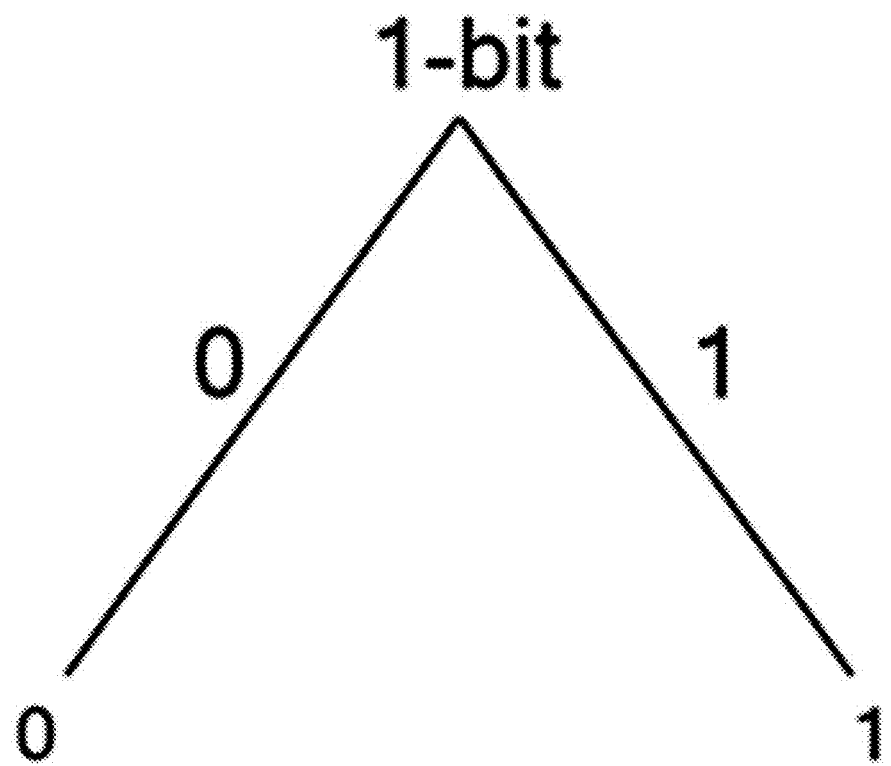
FIG. 6 is a conceptual diagram representing an example of multiple transform selection (MTS) signaling used to identify two transforms.

FIG. 6 is a conceptual diagram representing an example of MTS signaling used to identify two transforms. In the current version of VTM (Versatile Video Coding (Draft 4), Joint Video Experts Team (JVET), ITU-T SG 16 WP 3 and ISO/IEC JTC 1/SC 29/WG 11, 13th Meeting: Marrakech, Mass., 9-18 Jan. 2019, Document JVET-M1001, available at phenix.it-sudparis.eu/jvet/doc_end_user/documents/13_Marrakech/wg11/JVET-M1001-v7.zip), multiple transform candidates are signaled based on a truncated unary binarization, which can be illustrated by concatenating binary tree in FIGS. 6 and 7. Then, the transform candidates are associated with the codewords obtained by the concatenation.

Figure 7:
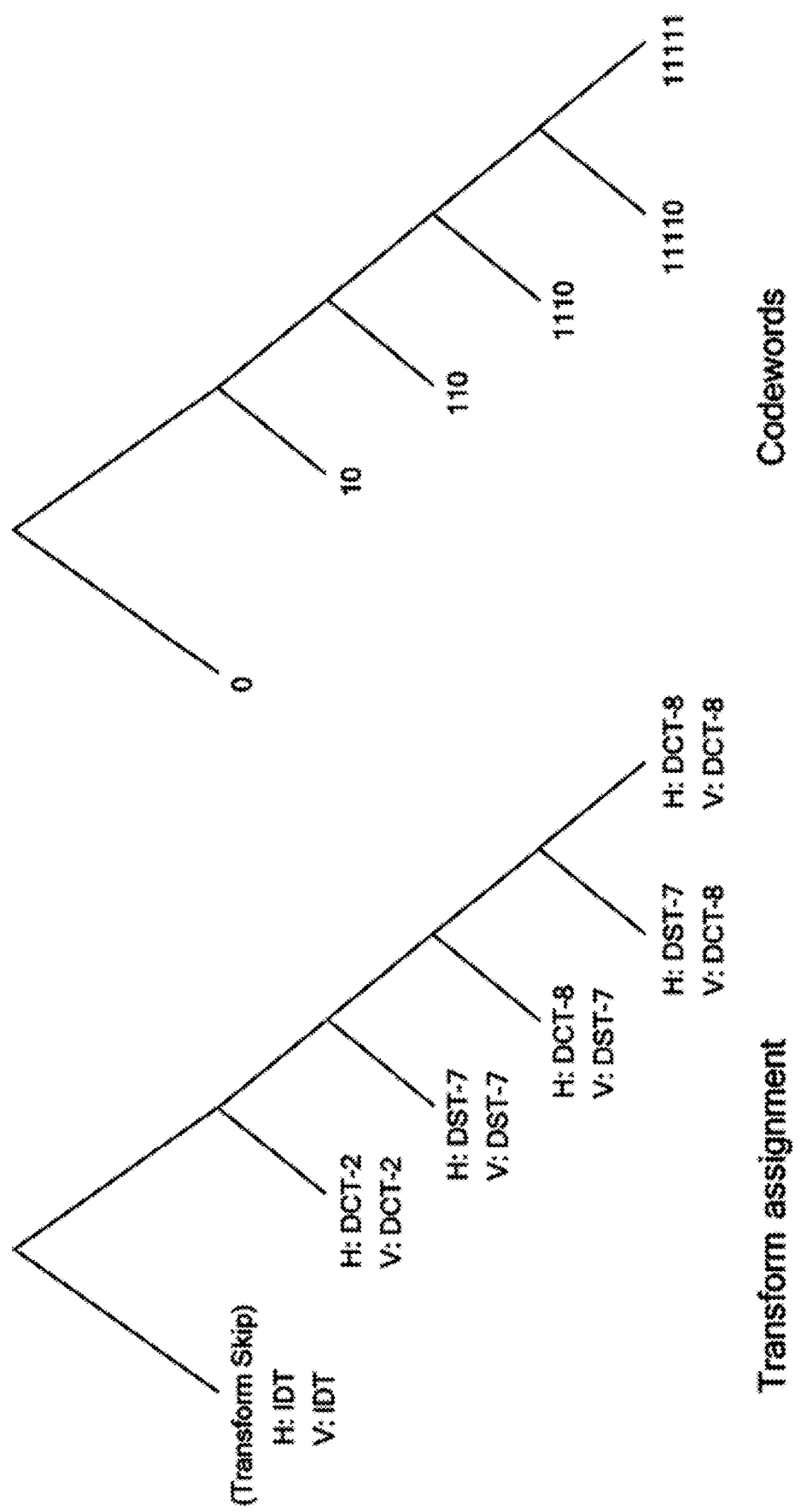
FIG. 7 is a conceptual diagram illustrating an example transform assignment and corresponding unary codewords.

FIG. 7 is a conceptual diagram illustrating an example transform assignment and corresponding unary codewords. MTS Signaling in the current version of VVC includes assigning transforms to codewords obtained by concatenating the binary tree in FIG. 6, where "H: DCT-8, V: DST-7" means DCT-8 is applied horizontally and DST-7 is applied vertically for separable transformation, and IDT denotes 1-D identity transform (performing scaling).

The MTS (multiple-transform-selection) design of VVC uses six transform candidates (as in FIG. 7), and it supports combinations with DST-7 and DCT-8 other than using a single type of transform in both horizontal and vertical directions (i.e., applying IDT, DCT-2 and DST-7 horizontally and vertically). In practice, a better coding efficiency can be achieved by allowing a larger number of transform candidates. This disclosure describes various extensions of the current MTS design that may improve coding efficiency.

An MTS scheme may be defined by assigning transforms to codewords of a specified signaling method. Video encoder 200 and/or video decoder 300 may be configured according to the techniques of this disclosure, as discussed above and in greater detail below. In particular, an MTS scheme according to this disclosure may be defined by assigning transforms to codewords of a specified signaling method. So, an MTS scheme may be completely defined by specifying: (i) a single set or multiple sets of transforms (i.e., transform candidates), and (ii) an associated signaling method. Thus, video encoder 200 and video decoder 300 may be configured to code an indication of an MTS scheme using any of the techniques of this disclosure, alone or in any combination.

The indication of the MTS scheme may be a codeword. In some examples, the MTS scheme may include both a primary transform, such as a separable transform (e.g., a horizontal transform and a vertical transform), and a secondary transform. In such examples, video encoder 200 and video decoder 300 may code a second codeword representing the secondary transform, where the second codeword may identify the secondary transform in a set of available secondary transforms.

The MTS design in VVC uses a single set of transforms including 6 separable transform candidates as shown in Table 1 below:

TABLE 1

Transform candidates allowed in VVC as shown in FIG. 7 and corresponding codewords used to signal the candidates

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | DCT-8 | DCT-8 | 11111 |

The example six transform candidates above may be signaled using the codewords generated by concatenating a binary tree (FIG. 6) as shown in FIG. 7 (right). For each codeword, a transform candidate may be assigned as illustrated in FIG. 7 (left).

Alternative MTS designs may be defined based on one or more combinations of the following techniques. That is, video encoder 200 and video decoder 300 may perform any of the techniques described below, alone or in any combination.

1. The MTS design can be extended by including new transform candidates with or without replacing the some of the current set of candidates in VVC, shown in Table 1.
2. Combinations of DCT-2 and DST-7 can be included as additional transform candidates.
   a. In one example, two more transform candidates can be added on top of the current VVC, so that in total 8 separable transform candidates are allowed as shown in Table 2:

TABLE 2

Transform candidates and associated codewords

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | DCT-8 | DCT-8 | 111110 |
| 7 | DCT-2 | DST-7 | 1111110 |
| 8 | DST-7 | DCT-2 | 1111111 | b. In another example, two more transform candidates can be added by removing the "H:DCT-8,V:DCT-8" combination, so that in total 7 separable transform candidates are allowed, as shown in Table 3:

TABLE 3

Example transform candidates including combinations of DCT2 and DST7 without H: DCT-8, V: DCT-8 combination

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | DCT-2 | DST-7 | 111110 |
| 7 | DST-7 | DCT-2 | 111111 |

3. Combinations of IDT and DST-7 can be included as additional transform candidates.
   a. For example, the following seven transform candidates may be used in MTS, as shown in Table 4.

TABLE 4

Example transform candidates including combinations of IDT and DST7 without H: DCT-8, V: DCT-8 combination

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | IDT | DST-7 | 111110 |
| 7 | DST-7 | IDT | 111111 | b. In another example, the following 10 transform candidates may be used in MTS by adding combinations of DCT-2 and DST-7 as well as combinations of IDT and DST-7.

TABLE 5

Example transform candidates including combinations of DCT-2 and DST-7 as well as IDT and DST-7 by keeping the H: DCT-8, V: DCT-8 combination as the 6th candidate

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | DCT-8 | DCT-8 | 111110 |
| 7 | IDT | DST-7 | 1111110 |
| 8 | DST-7 | IDT | 11111110 |
| 9 | DCT-2 | DST-7 | 111111110 |
| 10 | DST-7 | DCT-2 | 111111111 | c. In another example, the following 9 transform skip (which is equivalent to applying the identity candidates may be used in MTS by replacing DCT-8 and DCT-8 combination from the above list as follows:

TABLE 6

Example transform candidates including
combinations of DCT-2 and DST-7 as well as
IDT and DST-7 by removing the H: DCT-8,
V: DCT-8 combination

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | IDT | DST-7 | 111110 |
| 7 | DST-7 | IDT | 1111110 |
| 8 | DCT-2 | DST-7 | 11111110 |
| 9 | DST-7 | DCT-2 | 11111111 |

4. The candidates and their associated binarization (i.e., codewords) may have a different ordering.
   a. The ordering may be pre-defined and can be a fixed design based on the statistics/frequency of each transform candidate.
   b. For example, the ordering can be done by ranking the frequency of each transform candidate is used.
   c. For example, it can be designed to reduce average codeword length used to signal transform candidates (e.g., Huffman code generated based on the probability of each candidate used).
   d. For example, in a practical codec, H:DST-7, V:DST-7 and H:DCT-2, V:DCT-2 combinations are frequently used. Therefore, to reduce signaling overhead, the MTS design in Table 1 can be ordered as in the following example of Table 7:

TABLE 7

Example of reordering the transform candidates
in Table 1, where 1st and 3rd transform
candidates are swapped.

| Candidate | Horizontal (H) | Vertical (V) | Codeword |
|---|---|---|---|
| 1 | DST-7 | DST-7 | 0 |
| 2 | DCT-2 | DCT-2 | 10 |
| 3 | IDT | IDT | 110 |
| 4 | DCT-8 | DST-7 | 1110 |
| 5 | DST-7 | DCT-8 | 11110 |
| 6 | DCT-8 | DCT-8 | 11111 |

5. Depending on the prediction mode and/or block size, different MTS designs can be used for coding a block, where a block can be a transform unit (TU) or a coding unit (CU).
   a. Different MTS designs may include:
      i. different set of transform candidates;
      ii. different signaling and binarization (i.e., codewords used for each candidate);
      iii. both i) and ii) above.
   b. Multiple MTS designs may be used to determine transform choices depending on intra and/or inter prediction modes:
      i. Different types of prediction methods (e.g., intra and inter prediction) may use different MTS designs. For example, for coding inter-predicted for blocks the MTS defined in Table 1 may be used, while for intra-predicted block the MTS defined in Table 5 may be used to determine the transform.
      ii. Different subsets of intra-prediction modes may use different MTS designs. Different subsets of modes can be defined by mutually exclusive and collectively exhaustive selection of planar, DC and subsets of angular modes. For example, for planar (0), DC (1) and diagonal modes (34) the MTS design in Table 8 with 3 candidates can be used. For angular modes from (2) to (33), Table 9 may be used. For or the rest of the angular modes from (35) to (66), Table 10 may be used.

TABLE 8

Example of MTS design with 3 candidates

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 11 |

TABLE 9

Example of MTS design with 5 candidates

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 1111 |

TABLE 10

An example of MTS design with 5 candidates, where
4th and 5th candidates in Table 9 are swapped

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DST-7 | DCT-8 | 1110 |
| 5 | DCT-8 | DST-7 | 1111 | c. Multiple MTS designs may be used to determine transform choices depending on block-shape and block-size.
      i. Different MTS designs can be used for blocks of different size and/or shape.
      ii. For example, for coding small blocks, an MTS design with fewer candidates may be used, while for larger blocks another MTS design with more transform candidates may be used. Thus, transform signaling overhead for small blocks may be reduced.
      iii. Small blocks may be defined based on its width and/or height. For example, blocks having width or height that are less than 8 may be considered as small blocks, while remaining blocks can be considered as large blocks (e.g., if the minimum of width and height of a block is smaller than 16, then the block may be classified as small.).
      iv. Blocks can also be classified based on square/rectangular shape, where the ratio between width and height can be used to classify blocks with different shapes (e.g., 4×8 and 8×4 blocks may belong to one class, and blocks of size 4×16 and 16×4 may belong to another class).
   d. A single (unified) MTS design may also be used for signaling.

6. Context derivation for signaling transform candidates can also be made depending on one or combinations of the following:
   a. block size;
   b. block shape;
   c. intra-mode;
   d. inter-mode.
      Separate contexts may be defined for intra-predicted and inter-predicted CUs/TUs.
      Separate contexts may be defined based on the minimum of width and height of a block.
7. In addition to separable transforms, the MTS design may also include non-separable transforms as transform candidates. An example is illustrated in Table 11.

TABLE 11

Example transform candidates including non-separable transforms in addition to separable transforms in the MTS design

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | Non-separable Transform 1 | | 111110 |
| 7 | Non-separable Transform 2 | | 111111 |

Moreover, secondary transforms can be included in an MTS design in addition to separable transforms. Table 12 presents an example of MTS where the H: DCT-8, V: DCT-8 combination is replaced by a set of secondary transforms.

Secondary transforms may include the aspects described in U.S. application Ser. No. 15/270,455, filed Sep. 20, 2016 and Ser. No. 16/364,007 filed Mar. 25, 2019. Specifically, at the encoder side a secondary transform can be applied to a subset of primary transform coefficients (e.g., obtained from 2-D DCT-2), where the order is reversed at the decoder (first inverse secondary transform is applied, then a primary transformation is applied).

Figure 8:
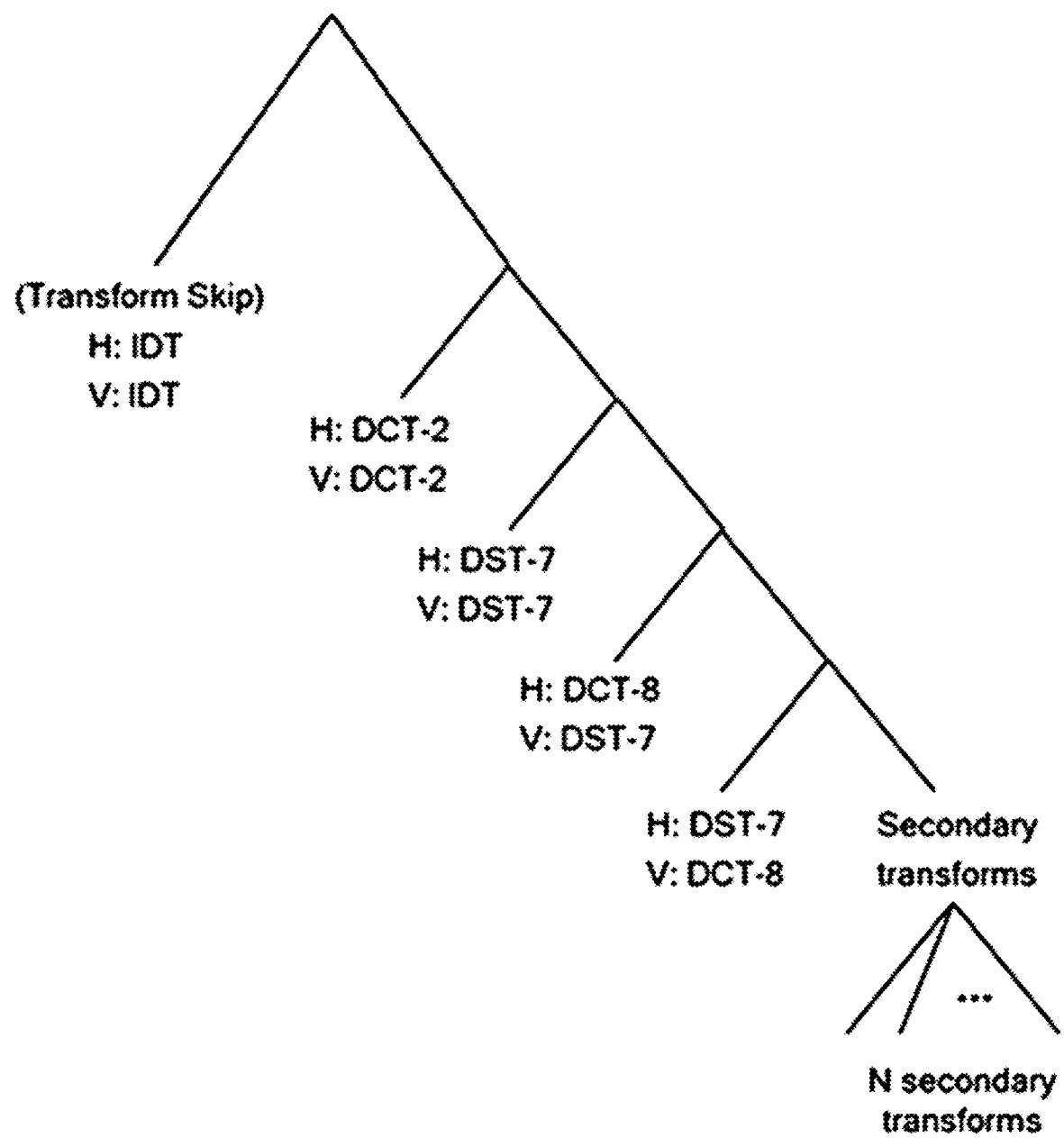
FIG. 8 is a conceptual diagram illustrating an example MTS design supporting secondary transforms.

Secondary transforms may require an additional signaling to determine the transform selected among multiple secondary transforms as illustrated in FIG. 8 and discussed in greater detail below. Note that, if there is only a single secondary transform candidate (i.e., the set may be only a single secondary transform), no additional signaling is required on top of the MTS signaling in Table 12.

For secondary transforms, transform candidates may also depend on one or combinations of prediction mode, block-size and block-shape.

TABLE 12

Transform candidates including secondary transforms in addition to separable transforms in the MTS design

| Candidate | Horizontal (H) | Vertical (V) | Codeword |
|---|---|---|---|
| 1 | IDT | IDT | 0 |
| 2 | DCT-2 | DCT-2 | 10 |
| 3 | DST-7 | DST-7 | 110 |
| 4 | DCT-8 | DST-7 | 1110 |
| 5 | DST-7 | DCT-8 | 11110 |
| 6 | Secondary Transforms | | 11111 |

8. Separable transforms in an MTS design may be constructed using combinations of other type of DSTs and DCTs (e.g., DST-4 and DCT-4) in addition to IDT, DST-7, DCT-8, and DCT-2.
9. One or combinations of the above methods can be used for intra predicted CUs.
10. One or combinations of the above methods can be used for inter predicted CUs.
11. One or combinations of the above methods can be used for both intra and inter predicted CUs.
12. One or combinations of the above methods can be used for luma or chroma channels or both.

FIG. 8 is a conceptual diagram illustrating an example MTS design supporting secondary transforms. If a secondary transform is signaled/chosen, additional signaling may be used to indicate a secondary transform among N possible secondary transforms. That is, video encoder 200 may encode a first codeword indicating a primary transform and that a secondary transform is to be applied in addition to the primary transform, and further encode a second codeword indicating the secondary transform of a set of transforms (e.g., one of the N available transforms depicted in FIG. 8). Similarly, video decoder 300 may decode the first codeword and determine that the first codeword indicates a primary transform and that a secondary transform is to be applied. Thus, video decoder 300 may further decode a second codeword in response to the first codeword, and use the second codeword to determine the secondary transform. Video encoder 200 and video decoder 300 may further apply both the primary and secondary transforms.

In some examples, as discussed in greater detail below, the secondary transform may be a Low-Frequency Non-separable Transformation (LFNST). Thus, the first codeword may be referred to as an MST syntax element, and the second codeword may be referred to as an LFNST syntax element.

Figure 9:
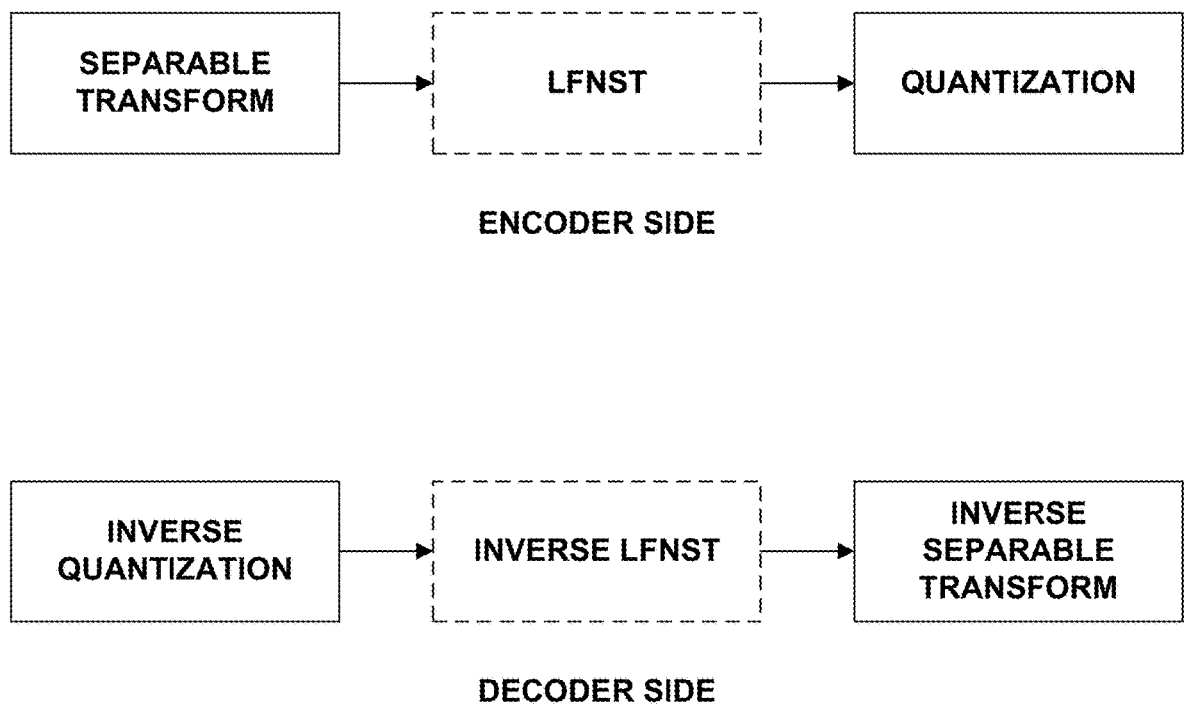
FIG. 9 is a conceptual diagram illustrating examples of low-frequency non-separable transforms (LFNST) that a video coder (video encoder or video decoder) may apply.
Figure 10:
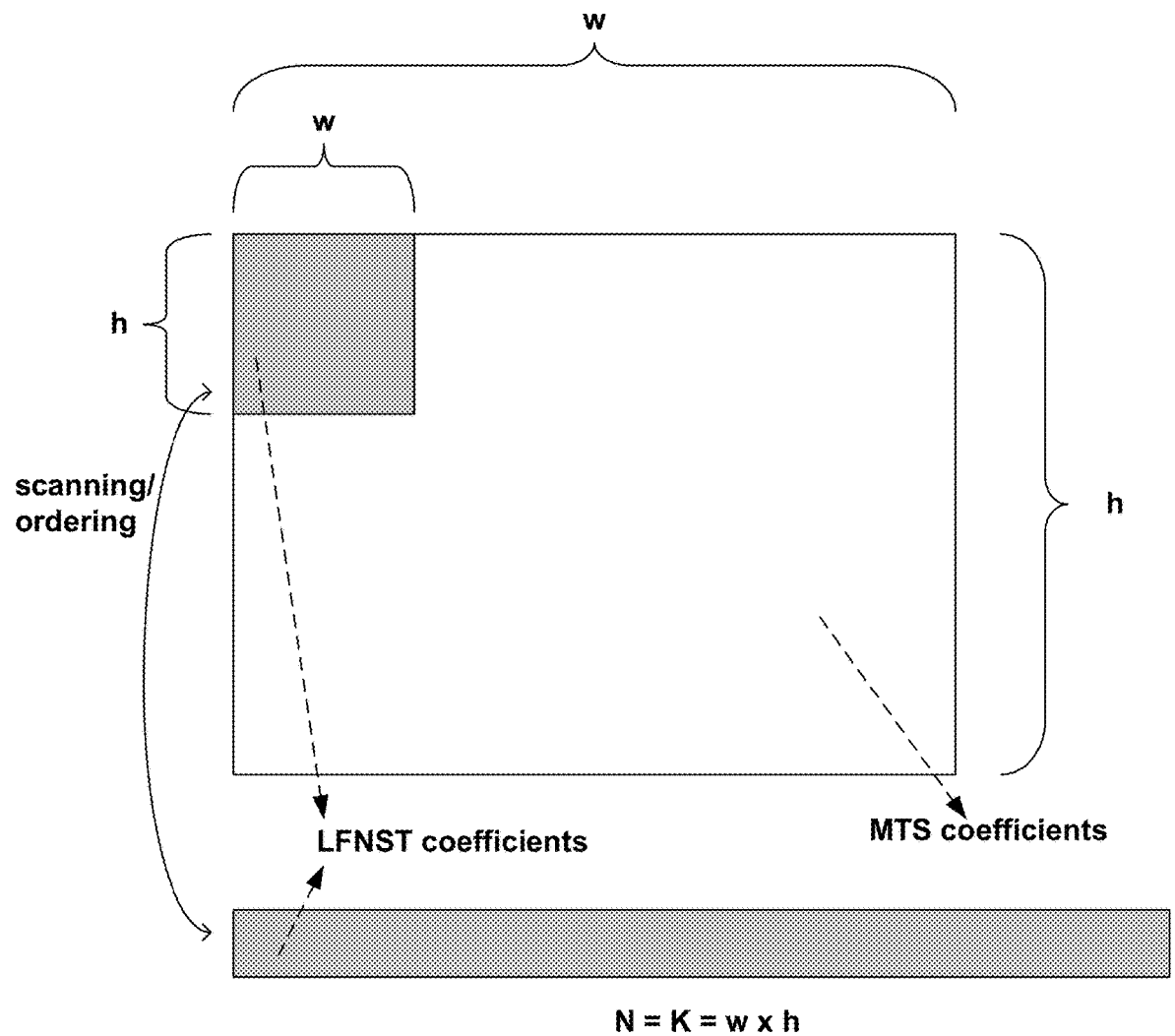
FIG. 10 is a conceptual diagram illustrating an example of an LFNST applied to a subset of coefficients (at the top-left part) of an H×W block.

FIGS. 9 and 10 are conceptual diagrams illustrating the use of Low-Frequency Non-separable Transformation (LFNST). LFNST is used in JEM-7.0 to further improve the coding efficiency of MTS, where an implementation of LFNST is based on a Hypercube-Givens Transform (HyGT), which is described in U.S. Patent Publication No. 2017/0238013, U.S. Patent Publication Nos. 2017/0094313, 2017/0238014, U.S. patent application Ser. No. 16/364,007, and U.S. Provisional Patent Applications 62/668,105 and 62/849,689 (describing alternative designs and further details). LFNST was previously called non-separable secondary transform (NSST) or secondary transform, but LFNST, NSST, and secondary transform may generally refer to the same techniques. Recently, LFNST was adopted into the draft VVC standard, as described in Koo et al., "CE6: Reduced Secondary Transform (RST) (CE6-3.1)," Joint Video Experts Team (JVET) of ITU-T SG 16 WP 3 and ISO/IEC JTC 1/SC 29/WG 11, 14$^{th}$ Meeting, Geneva, CH, 19-27 Mar. 2019, document JVET-N0193.

FIG. 9 is a conceptual diagram illustrating LFNST transforms applied by video encoder 200 and video decoder 300. LFNST introduces a new stage between separable transformation and quantization in a codec. FIG. 10 is a conceptual diagram illustrating LFNST applied to a subset of coefficients (at the top-left part) of an H×W block.

VVC Draft 5 includes the following specifications that introduce some encoder/decoder complexity with no significant coding benefit:
  1) LFNST can be used with any MTS transform except the transform skip (TS) mode,
  2) The context model used for signaling an LFNST index depends on an MTS index. For instance, a video coder may select a context model used in CABAC coding (or other coding technique) the LFNST index based on an MTS index. The context model may indicate a probability of a first bit of the LFNST index having a particular value.
3) LFNST can be used in coding chroma channels, although MTS is normatively disabled for chroma,
4) LFNST applied on 4×4 and 8×8 blocks can be implemented using a single stage (i.e., using a single non-separable transform), yet the current implementation is based on a two-stage process.

This disclosure describes techniques that may simplify the LFNST design by addressing the above issues. The LFNST designs described in this disclosure may be used individually or in any combination.

In VVC Draft 5, LFNST includes 3 modes, which are signaled using LFNST index values 0, 1 and 2, where:
 LFNST index 0 corresponds to skipping the LFNST process (e.g., only MTS is used),
 LFNST indices 1 and 2 are used to determine a non-separable transform from a set of two transforms chosen depending on a mode and a size of a block (e.g., a CU, TU, etc.).

Based on this design, LFNST can be restricted to be used under certain conditions:
 LFNST may be applied together with a predefined set of transforms (i.e., certain MTS candidates). So, LFNST index may be signaled if a transform from the predefined set is selected, and the set may depend on block dimensions (width and height). Otherwise, i.e., if a transform out of the predefined set is chosen, LFNST index may be inferred as zero so that LFNST is skipped (i.e., not applied).
 The use of LFNST can be restricted based on transform type and/or MTS index/flag and/or block dimensions.
  LFNST can be enabled when predefined transforms types and/or MTS indices/flags are used.
   LFNST can be enabled if separable 2-D DCT-2 is used (i.e., if DCT-2 is applied horizontally and vertically)
    In VVC, this corresponds to signaling an LFNST index if the MTS index/flag is zero (i.e., 2-D DCT-2 is used), and the LFNST index/flag is not signaled and is inferred by video decoder 300 as zero if the MTS index/flag is different than 0.
    In this case, the context model for coding the LFNST index/flag does not depend on the MTS index.
  LFNST can be disabled for transform skip mode.
   When transform skip is enabled, LFNST process is skipped and LFNST index/flag is inferred as 0.
  Context models for coding signaling of the LFNST index may depend on the MTS index. For each MTS index, separate contexts can be defined for coding LFNST indices.
 LFNST can be used for luma blocks and can be disabled for the chroma channel. So, the LFNST index is not signaled and inferred as 0 for the chroma channel.

Hence, in an example in accordance with one or more techniques of this disclosure, video encoder 200 may add to a bitstream that comprises an encoded representation of the video data, a LFNST index for a current block of the video data if one or more restrictions on the signaling of the LFNST index do not apply for the current block. Additionally, in this example, video encoder 200 may apply a transform to residual data for the current block to generate to generate intermediate data for the current block. In this example, based on a value of the LFNST index, video encoder 200 may apply a LFNST to the intermediate data to generate transform coefficients for the current block. Video encoder 200 may include data representing the transform coefficients for the current block in the bitstream.

In one example in accordance with one or more techniques of this disclosure, video decoder 300 may obtain, from a bitstream including an encoded representation of the video data, a LFNST index for a current block of the video data if one or more restrictions on the signaling of the LFNST index do not apply for the current block. In this example, video decoder 300 may determine, based on data in the bitstream, a block of transform coefficients. Based on a value of the LFNST index, video decoder 300 may apply an inverse LFNST to the block of transform coefficients to generate intermediate data for the current block. Video decoder 300 may apply an inverse of a transform to the intermediate data for the current block to generate residual data for the current block. In this example, video decoder 300 may reconstruct samples of the current block based on the residual data for the current block.

FIGS. 11A and 11B are conceptual diagrams illustrating an example two-step LFNST process implementation per the VVC test model (VTM) of May 30, 2019. In this example, the LFNST is applied on top of a subset of separable transform coefficients (e.g., MTS coefficients) within the darker-shaded subblock at the top-left region. This two-step procedure may be unavoidable for the block shapes/sizes in FIG. 11A. However, for 4×4 and 8×8 blocks, as shown in FIG. 11B, LFNST and separable transform sizes are aligned (i.e., the support of LFNST and separable transforms may include the same coefficient locations/positions within the darker-shaded block). In this case, this transform process can be reduced to a single-stage non-separable transform as follows:
 Instead of applying a LFNST in two stages (e.g., instead of applying LFNST with a separable transform), video encoder 200 and video decoder 300 may obtain the coefficients directly from a non-separable transform in one stage. For example:
  For 4×4 case, a 16-length non-separable transform is used, which can be implemented as a matrix-vector multiplication.
  For 8×8 case, a 64-length non-separable transform is used, which can also be implemented as a matrix-vector multiplication.
 Moreover, the zero-out scheme (e.g., described in U.S. Provisional Patent Application 62/849,689) can be used to reduce the number of multiplications required for matrix-based implementations.
  In a zero-out scheme, the first K lowest-frequency coefficients may need to be computed, and the rest of the transform coefficients may be zeroed-out normatively (i.e., assumed to be zero, at both video encoder 200 and video decoder 300).
   The value of K may depend on the block size. For example:
    For 4×4 blocks, K can be 8, so the remaining 8 coefficients are normatively zeroed out.
    For 8×8 blocks, K can be 8, so the remaining 56 coefficients are normatively zeroed out.
    For 8×8 blocks, K can be 16, so the remaining 48 coefficients are normatively zeroed out.
 LFNST can be implemented as a single stage non-separable transform for 4×4 and 8×8, and for other cases LFNST may be implemented as a two-step process as described in U.S. Provisional Patent 62/337,736.

In an example in accordance with the techniques of this disclosure, video encoder 200 may determine residual data for a first block of the video data. Additionally, video encoder 200 may determine residual data for a second block of the video data. Based on a width of the first block being equal to a height of the first block: video encoder 200 may apply a non-separable transform to the residual data for the first block to generate transform coefficients for the first block; and include, in a bitstream that includes an encoded representation of the video data, data representing the transform coefficients for the first block. In this example, based on a width of the second block not being equal to a height of the second block, video encoder 200 may apply a transform to the residual data for the second block to generate intermediate data for the second block; apply a LFNST to the intermediate data for the second block to generate transform coefficients for the second block; and include, in the bitstream, data representing the transform coefficients for the second block.

In another example in accordance with the techniques of this disclosure, video decoder 300 may determine, based on first data in a bitstream that includes an encoded representation of the video data, transform coefficients for a first block of the video. Additionally, video decoder 300 may determine, based on second data in the bitstream, transform coefficients for a second block of the video data. Based on a width of the first block being equal to a height of the first block, video decoder 300 may apply an inverse of a non-separable transform to the transform coefficients for the first block to generate residual data for the first block; and reconstruct samples of the first block based on the residual data for the first block. In this example, based on a width of the second block not being equal to a height of the second block, video decoder 300 may apply an inverse transform to the transform coefficients for the second block to generate intermediate data for the second block; apply an inverse of a LFNST to the intermediate data for the second block to generate residual data for the second block; and reconstruct samples of the second block based on the residual data for the second block.

Figure 12:
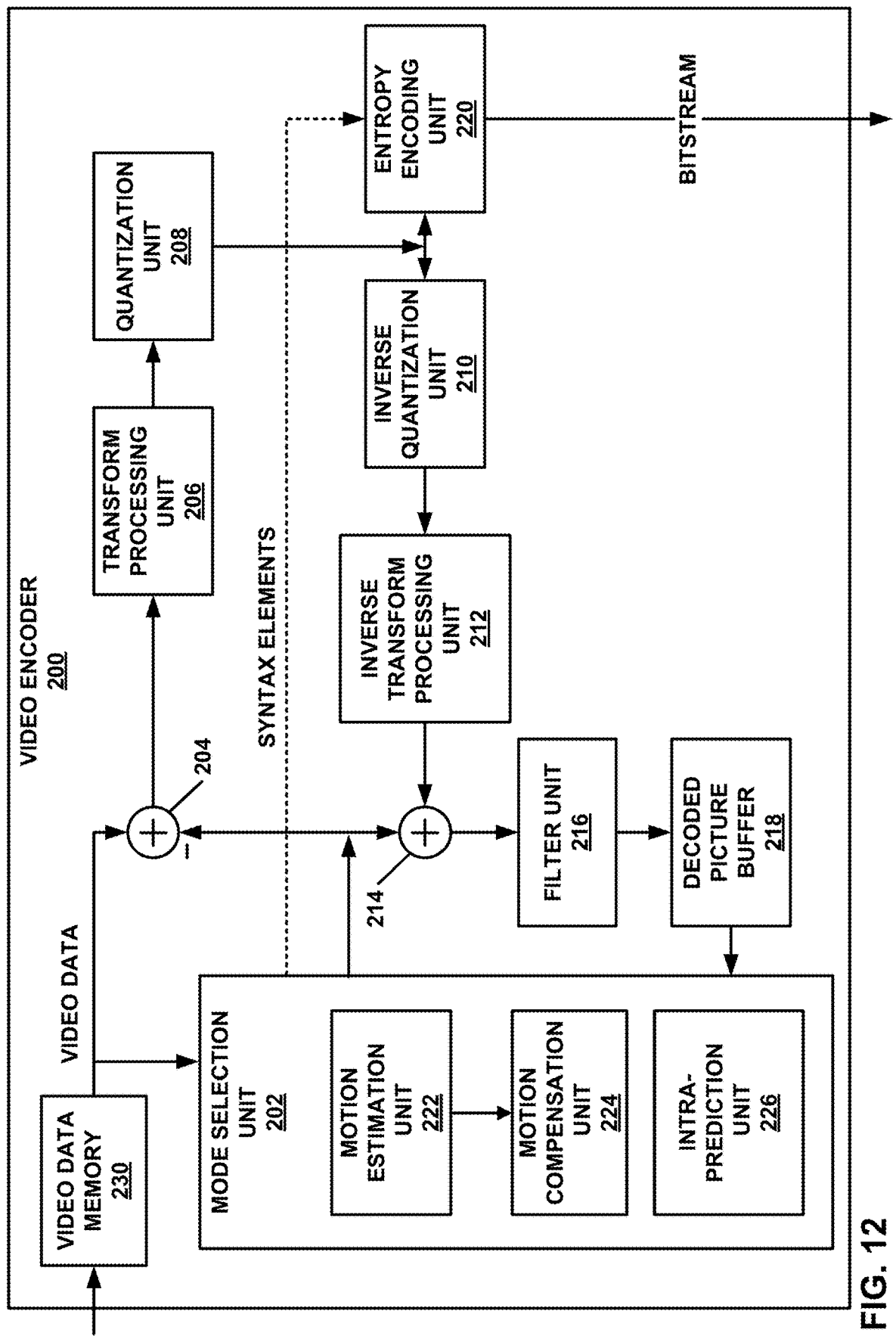
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. FIG. 12 may further include a transform bank from which transform processing unit 206 and inverse transform processing unit 212 select transforms according to the techniques of this disclosure, as shown in FIG. 4 above. Likewise, as shown in FIG. 4, transform processing unit 206 may provide an indication of a selected transform to entropy encoding unit 220, which may encode data according to the techniques of this disclosure representing which of a variety of transforms for an MTS scheme is selected for a current block of video data.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In accordance with the techniques of this disclosure, transform processing unit 206 may select a transform scheme (e.g., an MTS scheme) including both a primary transform and a secondary transform. The primary transform may be a separable transform including a horizontal transform and a vertical transform, such as one of a variety of DCTs and/or DSTs. The secondary transform may be an LFNST. Transform processing unit 206 may additionally provide an indication of the selected transform scheme and, if the selected transform scheme includes a secondary transform, an indication of the selected secondary transform to entropy encoding unit 220. Entropy encoding unit 220 may, in turn, encode a first codeword representing the selected transform scheme (which may also indicate whether the selected transform scheme includes a secondary transform). If the selected transform scheme includes a secondary transform, such as an LFNST, entropy encoding unit 220 may further encode a second codeword representing the selected secondary transform. Video encoder 200 may determine that the selected transform scheme includes the secondary transform if, for example, the primary transform includes a DCT-2 horizontal transform and a DCT-2 vertical transform, as discussed above. Furthermore, transform processing unit 206 may apply the primary transform to the residual block. If the selected transform scheme includes the secondary transform, transform processing unit 206 may also apply the secondary transform following the primary transform.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. According to the techniques of this disclosure, inverse transform processing unit 212 may apply an inverse secondary transform and then an inverse primary transform to the transform coefficients. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block.

Figure 13:
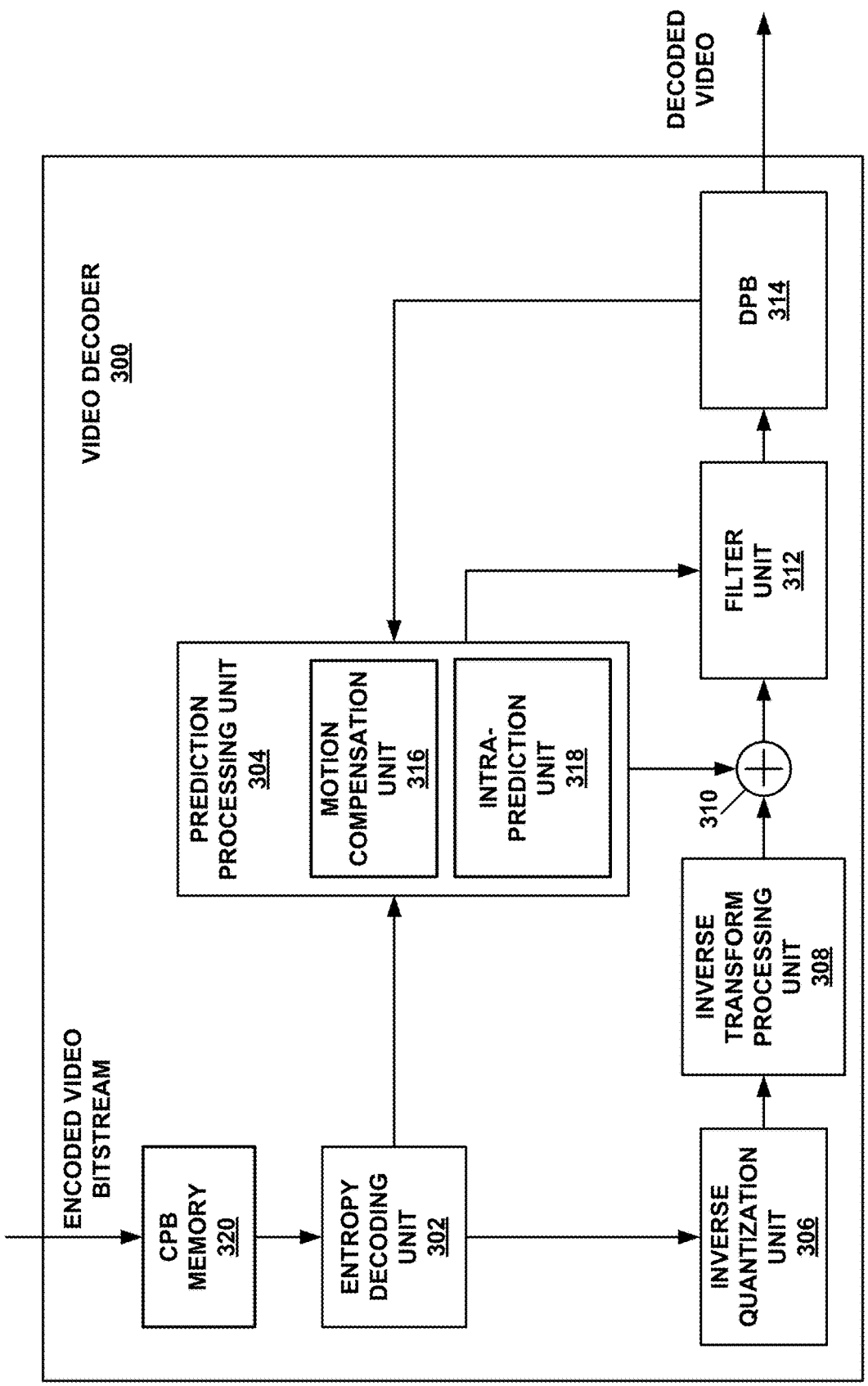
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 is described according to the techniques of VVC and HEVC. However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. FIG. 13 may further include a transform bank from which inverse transform processing unit 308 select transforms according to the techniques of this disclosure, as shown in FIG. 4 above. Likewise, reciprocal to the techniques shown in FIG. 4, entropy decoding unit 302 may decode data according to the techniques of this disclosure representing which of a variety of transforms for an MTS scheme is selected for a current block of video data and provide an indication of the transform to inverse transform processing unit 308.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

According to the techniques of this disclosure, entropy decoding unit 302 may decode a first codeword representing a transform scheme to be applied to decoded transform coefficients for a current block of video data. Entropy decoding unit 302 may further determine whether the selected transform scheme includes a secondary transform (e.g., an LFNST) to be applied in addition to a primary transform. For example, if the primary transform includes a DCT-2 horizontal transform and a DCT-2 vertical transform, entropy decoding unit 302 may determine that the secondary transform is also to be applied. Moreover, in response to determining that the secondary transform is to be applied, entropy decoding unit 302 may also decode a second codeword representing the secondary transform of a set of available secondary transforms.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block. If the transform scheme includes a secondary transform, inverse quantization unit 306 may apply the secondary transform prior to applying a primary transform.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Video decoder 300 represents an example of a video decoding device including a memory configured to store video data, and one or more processing units implemented in circuitry and configured to code a first codeword representing a selected transform scheme of a set of transform candidates of a multiple transform selection (MTS) scheme for a current block of video data, the selected transform scheme being a secondary transform of a set of available secondary transforms to be applied in addition to a primary transform; code a second codeword representing the secondary transform from the set of available secondary transforms; and apply the primary transform and the secondary transform during coding of residual data for the current block.

Figure 14:
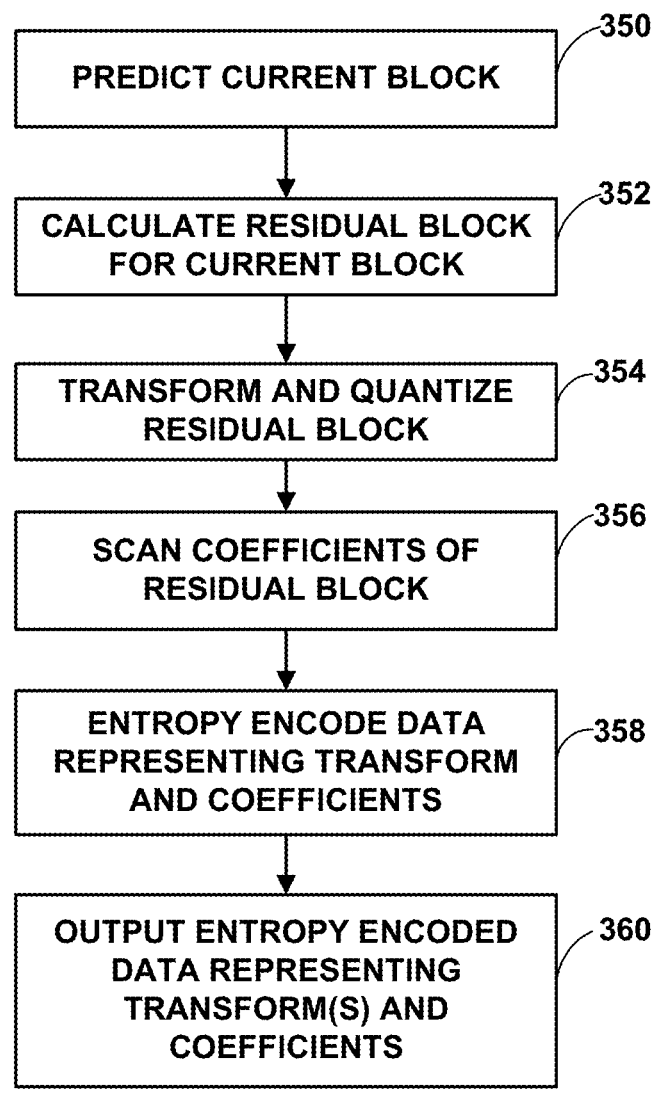
FIG. 14 is a flowchart illustrating an example method for encoding a current block according to the techniques of this disclosure.

FIG. 14 is a flowchart illustrating an example method for encoding a current block according to the techniques of this disclosure. The current block may comprise a current CU. Although described with respect to video encoder 200 (FIGS. 1 and 12), it should be understood that other devices may be configured to perform a method similar to that of FIG. 14.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then select a transform and use the selected transform and quantize coefficients of the residual block (354). The selected transform may include a primary transform and/or a secondary transform, such as an LFNST. Video encoder 200 may apply either or both of a primary transform and/or the secondary transform according to the selected transform.

Next, video encoder 200 may scan the quantized transform coefficients of the residual block (356). During the scan, or following the scan, video encoder 200 may entropy encode the coefficients, as well as data representing the selected transform (358). For example, video encoder 200 may entropy encode data representing the transform using any of the various techniques of this disclosure as discussed above. Video encoder 200 may encode the coefficients using CAVLC or CABAC. In particular, video encoder 200 may select a transform scheme according to the techniques of this disclosure and entropy encode a codeword representing the selected transform according to any of the techniques of this disclosure. If the selected transform scheme includes a secondary transform, video encoder 200 may further encode a second codeword representing the secondary transform from a set of available secondary transforms, e.g., as discussed above with respect to FIG. 8. Video encoder 200 may then output the entropy encoded data representing the transform(s) and coefficients of the block (360).

In this manner, the method of FIG. 14 represents an example of a method of encoding video data, the method including coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; coding a second codeword representing the secondary transform from the set of available secondary transforms; and applying the primary transform and the secondary transform during coding of residual data for the current block.

Figure 15:
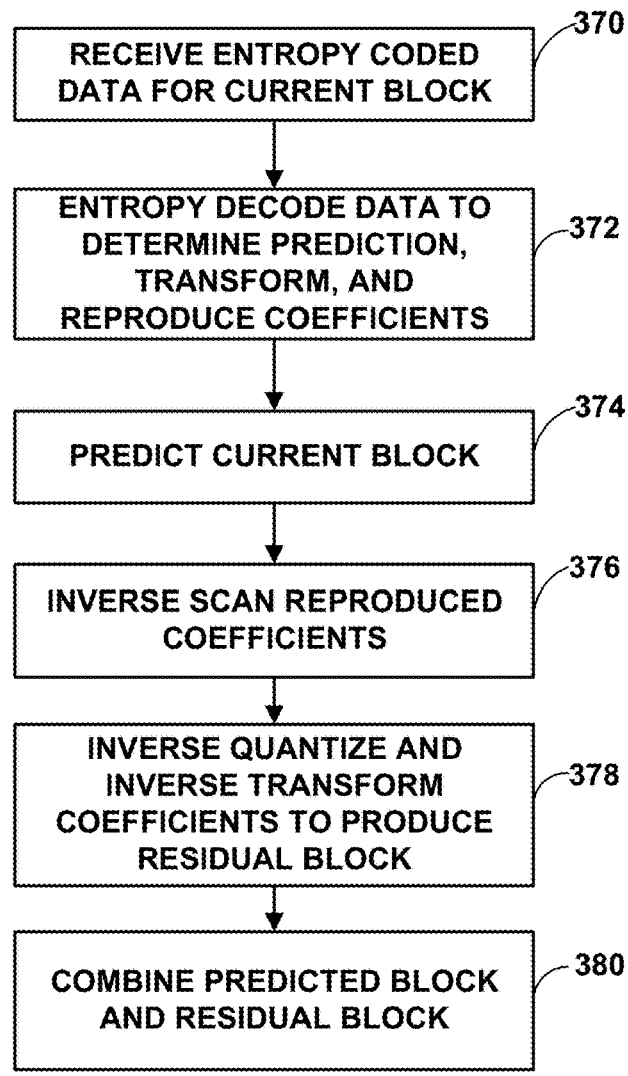
FIG. 15 is a flowchart illustrating an example method for decoding a current block of video data according to the techniques of this disclosure.

FIG. 15 is a flowchart illustrating an example method for decoding a current block of video data according to the techniques of this disclosure. The current block may comprise a current CU. Although described with respect to video decoder 300 (FIGS. 1 and 13), it should be understood that other devices may be configured to perform a method similar to that of FIG. 15.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block, a transform for the current block, and to reproduce coefficients of the residual block (372). Video decoder 300 may entropy decode the transform information according to any of the various techniques of this disclosure. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients using the indicated transform to produce a residual block (378). For example, video decoder 300 may decode a codeword representing a transform to be applied according to any of the techniques of this disclosure. Video decoder 300 may ultimately decode the current block by combining the prediction block and the residual block (380).

In this manner, the method of FIG. 15 represents an example of a method of decoding video data, the method including coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; coding a second codeword representing the secondary transform from the set of available secondary transforms; and applying the primary transform and the secondary transform during coding of residual data for the current block.

Figure 16:
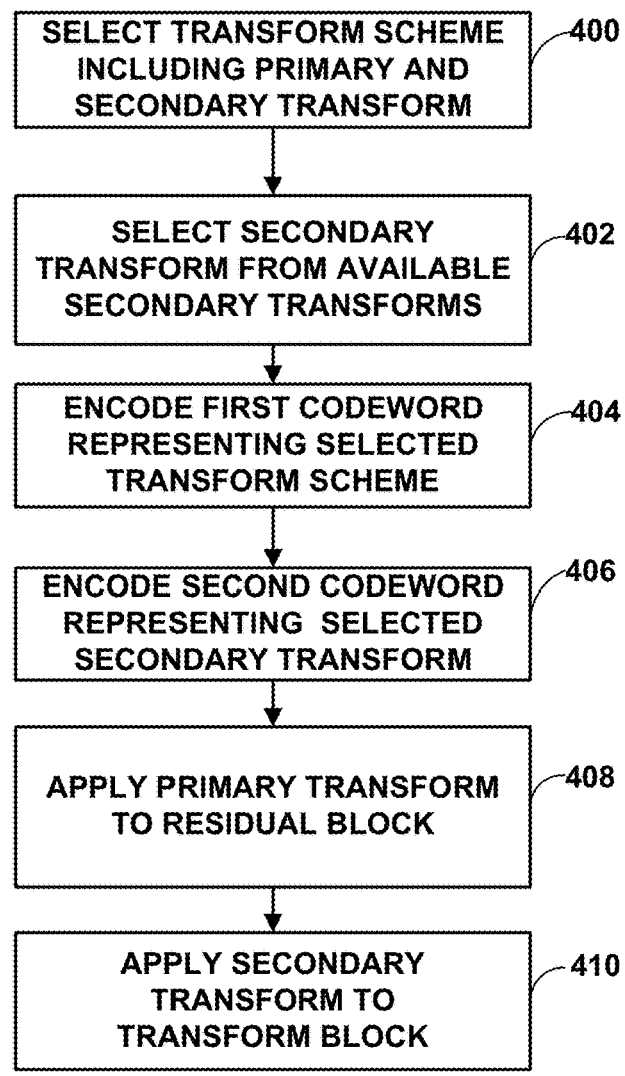
FIG. 16 is a flowchart illustrating an example video encoding method in accordance with the techniques of this disclosure.

FIG. 16 is a flowchart illustrating an example video encoding method in accordance with the techniques of this disclosure. For purposes of example, the method of FIG. 16 is explained with respect to video encoder 200 of FIGS. 1 and 12, although it should be understood that other video encoders may be configured to perform this or a similar method.

Initially, video encoder 200 may select a transform scheme including a primary and a secondary transform (400). Mode selection unit 202 may also select the secondary transform from a set of available secondary transforms (402). For example, mode selection unit 202 may cause the various components of video encoder 200 to perform various encoding passes, including testing of various transform schemes. Mode selection unit 202 may calculate rate-distortion metrics and determine that the selected transform scheme, including the primary and the selected secondary transform, yields the best tested rate-distortion characteristics.

Video encoder 200 may then encode a first codeword representing the selected transform scheme (404). Additionally, video encoder 200 may encode a second codeword representing the selected secondary transform scheme (406). In particular, entropy encoding unit 220 may entropy encode the first and second codewords.

Video encoder 200 may then apply the primary transform to a residual block (408). In particular, transform processing unit 206 may apply the primary transform to the residual block, producing a transform block of transform coefficients. Video encoder 200 (in particular, transform processing unit 206) may also apply the secondary transform to the transform block (410).

In this manner, the method of FIG. 16 represents an example of a method of encoding video data, the method including coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; coding a second codeword representing the secondary transform from the set of available secondary transforms; and applying the primary transform and the secondary transform during coding of residual data for the current block.

Figure 17:
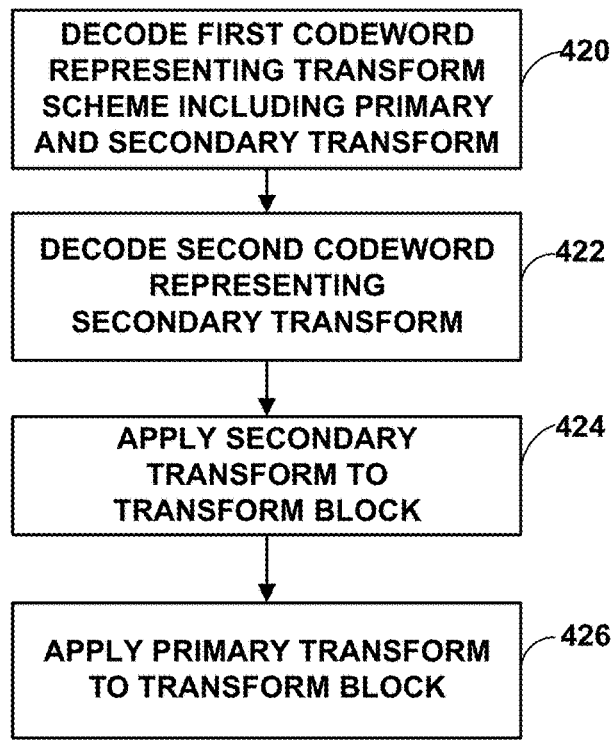
FIG. 17 is a flowchart illustrating an example video decoding method in accordance with the techniques of this disclosure.

FIG. 17 is a flowchart illustrating an example video decoding method in accordance with the techniques of this disclosure. For purposes of example, the method of FIG. 17 is explained with respect to video decoder 300 of FIGS. 1 and 13, although it should be understood that other video encoders may be configured to perform this or a similar method.

Video decoder 300 may initially decode a first codeword representing a transform scheme that includes both a primary transform and a secondary transform (420). In particular, entropy decoding unit 302 may entropy decode the first codeword. Entropy decoding unit 302 of video decoder 300 may also entropy decode a second codeword representing the secondary transform in a set of available secondary transforms (422). For example, the second codeword may act as an index into the set of available secondary transforms.

Video decoder 300 may then apply the secondary transform to decoded transform coefficients of a transform block (424) to produce an intermediate transform block. Video decoder 300 may also apply the primary transform to the intermediate transform block to reproduce a residual block (426). In particular, inverse transform processing unit 308 may apply the secondary and primary transforms.

In this manner, the method of FIG. 17 represents an example of a method of decoding video data, the method including coding a first codeword representing a selected transform scheme of a set of transform candidates of a multiple transform selection (MTS) scheme for a current block of video data, the selected transform scheme being a secondary transform of a set of available secondary transforms to be applied in addition to a primary transform; coding a second codeword representing the secondary transform from the set of available secondary transforms; and applying the primary transform and the secondary transform during coding of residual data for the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining that a first codeword representing a selected transform scheme of a set of transform candidates of a multiple transform selection (MTS) scheme for a current block of video data has a value indicating that a discrete cosine transform 2 (DCT-2) primary transform is to be applied to the current block;
    coding a second codeword representing a secondary transform from a set of available secondary transforms to be applied to the current block when the first codeword has the value indicating that the DCT-2 primary transform is to be applied to the current block; and
    applying the DCT-2 primary transform and the secondary transform during coding of residual data for the current block.

2. The method of claim 1, wherein the set of transform candidates includes:
    1) a horizontal identity transform and a vertical identity transform;
    2) a discrete cosine transform (DCT)-2 horizontal transform and a DCT-2 vertical transform;
    3) a discrete sine transform (DST)-7 horizontal transform and a DST-7 vertical transform;
    4) a DCT-8 horizontal transform and the DST-7 vertical transform;
    5) the DST-7 horizontal transform and a DST-8 vertical transform;
    6) a first non-separable transform; and
    7) a second non-separable transform.

3. The method of claim 1, wherein the set of transform candidates includes:
    1) a horizontal identity transform and a vertical identity transform;
    2) a discrete cosine transform (DCT)-2 horizontal transform and a DCT-2 vertical transform;
    3) a discrete sine transform (DST)-7 horizontal transform and a DST-7 vertical transform;
    4) a DCT-8 horizontal transform and the DST-7 vertical transform;
    5) the DST-7 horizontal transform and a DST-8 vertical transform; and
    6) the secondary transform of the set of available secondary transforms.

4. The method of claim 1, wherein the set of transform candidates excludes a combination of a discrete cosine transform (DCT)-8 horizontal transform and a DCT-8 vertical transform.

5. The method of claim 1, wherein codewords associated with the transform candidates comprise Huffman codes.

6. The method of claim 1, wherein determining that the first codeword has the value indicating that the DCT-2 primary transform is to be applied to the current block comprises determining that the first codeword has the value indicating that the DCT-2 primary transform is to be applied to the current block according to at least one of a prediction mode or a size of the current block.

7. The method of claim 6, further comprising selecting the MTS scheme from a set of MTS schemes each including at least one of different sets of transform candidates or different binarizations for the transform candidates according to at least one of the prediction mode or the size of the current block.

8. The method of claim 6, further comprising selecting the MTS scheme according to whether the prediction mode is an intra-prediction mode or an inter-prediction mode.

9. The method of claim 6, further comprising selecting the MTS scheme from a set of MTS schemes according to at least one of a shape of the current block or a size of the current block.

10. The method of claim 9, wherein the set of MTS schemes includes a first MTS scheme having a first number of transform candidates for a first size of blocks and a second MTS scheme having a second number of transform candidates for a second size of blocks, the second number being larger than the first number and the second size being larger than the first size.

11. The method of claim 6, wherein the size of the current block is defined according to at least one of a width of the current block or a height of the current block.

12. The method of claim 6, wherein a shape of the current block is defined as square or rectangular.

13. The method of claim 1, wherein the set of transform candidates includes one or more separable transform candidates and one or more non-separable transform candidates.

14. The method of claim 1, wherein the second codeword comprises a value for a low-frequency non-separable transform (LFNST) syntax element.

15. The method of claim 14, wherein the first codeword comprises an MTS syntax element.

16. The method of claim 1,
wherein coding the second codeword comprises decoding the second codeword; and
wherein applying the DCT-2 primary transform and the secondary transform comprises:
applying the secondary transform to decoded transform coefficients to produce intermediate transform coefficients; and
applying the DCT-2 primary transform to the intermediate transform coefficients to produce a residual block for the current block.

17. The method of claim 1,
wherein coding the second codeword comprises encoding the second codeword; and
wherein applying the DCT-2 primary transform and the secondary transform comprises:
applying the DCT-2 primary transform to a residual block for the current block to generate intermediate transform coefficients; and
applying the secondary transform to the intermediate transform coefficients.

18. The method of claim 1, wherein determining that the first codeword has the value indicating that the DCT-2 primary transform is to be applied to the current block comprises determining that the first codeword has a value of zero.

19. A device for coding video data, the device comprising:
a memory configured to store video data; and
one or more processors implemented in circuitry and configured to:
determine that a first codeword representing a selected transform scheme of a set of transform candidates of a multiple transform selection (MTS) scheme for a current block of the video data has a value indicating that a discrete cosine transform 2 (DCT-2) primary transform is to be applied to the current block;
code a second codeword representing a secondary transform from a set of available secondary transforms to be applied to the current block when the first codeword has the value indicating that the DCT-2 primary transform is to be applied to the current block; and
apply the DCT-2 primary transform and the secondary transform during coding of residual data for the current block.

20. The device of claim 19, wherein the set of transform candidates includes:
1) a horizontal identity transform and a vertical identity transform;
2) a discrete cosine transform (DCT)-2 horizontal transform and a DCT-2 vertical transform;
3) a discrete sine transform (DST)-7 horizontal transform and a DST-7 vertical transform;
4) a DCT-8 horizontal transform and the DST-7 vertical transform;
5) the DST-7 horizontal transform and a DST-8 vertical transform;
6) a first non-separable transform; and
7) a second non-separable transform.

21. The device of claim 19, wherein the set of transform candidates includes:
1) a horizontal identity transform and a vertical identity transform;
2) a discrete cosine transform (DCT)-2 horizontal transform and a DCT-2 vertical transform;
3) a discrete sine transform (DST)-7 horizontal transform and a DST-7 vertical transform;
4) a DCT-8 horizontal transform and the DST-7 vertical transform;
5) the DST-7 horizontal transform and a DST-8 vertical transform; and
6) the secondary transform of the set of available secondary transforms.

22. The device of claim 19, wherein the set of transform candidates excludes a combination of a discrete cosine transform (DCT)-8 horizontal transform and a DCT-8 vertical transform.

23. The device of claim 19, wherein the one or more processors are configured to determine that the first codeword has the value indicating that the DCT-2 primary transform is to be applied to the current block according to at least one of a prediction mode or a size of the current block.

24. The device of claim 19 wherein the second codeword comprises a value for a low-frequency non-separable transform (LFNST) syntax element.

25. The device of claim 24, wherein the first codeword comprises an MTS syntax element.

26. The device of claim 19, wherein the device comprises a video decoder, and wherein the one or more processors are configured to:
decode the second codeword;
apply the secondary transform to decoded transform coefficients to produce intermediate transform coefficients; and
apply the DCT-2 primary transform to the intermediate transform coefficients to produce a residual block for the current block.

27. The device of claim 19, wherein the device comprises a video encoder, and wherein the one or more processors are configured to:
- encode the second codeword;
- apply the DCT-2 primary transform to a residual block for the current block to generate intermediate transform coefficients; and
- apply the secondary transform to the intermediate transform coefficients.

28. The device of claim 19, further comprising a display configured to display decoded video data.

29. The device of claim 19, wherein the device comprises one or more of a camera, a computer, a mobile device, a broadcast receiver device, or a set-top box.

30. The device of claim 19, wherein the device comprises at least one of:
- an integrated circuit;
- a microprocessor; or
- a wireless communication device.

31. The device of claim 19, wherein, to determine that the first codeword has the value indicating that the DCT-2 primary transform is to be applied to the current block, the one or more processors are configured to determine that the first codeword has a value of zero.

32. A device for coding video data, the device comprising:
- means for determining that a first codeword representing a selected transform scheme of a set of transform candidates of a multiple transform selection (MTS) scheme for a current block of video data has a value indicating that a discrete cosine transform 2 (DCT-2) primary transform is to be applied to the current block;
- means for coding a second codeword representing a secondary transform from a set of available secondary transforms to be applied to the current block when the first codeword has the value indicating that the DCT-2 primary transform is to be applied to the current block; and
- means for applying the DCT-2 primary transform and the secondary transform during coding of residual data for the current block.

33. The device of claim 32, wherein the second codeword comprises a value for a low-frequency non-separable transform (LFNST) syntax element.

34. The device of claim 32, wherein the device comprises a video decoder; P1 wherein the means for coding the second codeword comprises means for decoding the second codeword; and
- wherein the means for applying the DCT-2 primary transform and the secondary transform comprises:
  - means for applying the secondary transform to decoded transform coefficients to produce intermediate transform coefficients; and
  - means for applying the DCT-2 primary transform to the intermediate transform coefficients to produce a residual block for the current block.

35. The device of claim 32, wherein the means for determining that the first codeword has the value indicating that the DCT-2 primary transform is to be applied to the current block comprises means for determining that the first codeword has a value of zero.

36. A non-transitory computer-readable storage medium having stored thereon instructions that, when executed, cause a processor of a device for coding video data to:
- determine that a first codeword representing a selected transform scheme of a set of transform candidates of a multiple transform selection (MTS) scheme for a current block of video data has a value indicating that a discrete cosine transform 2 (DCT-2) primary transform is to be applied to the current block;
- code a second codeword representing a secondary transform from a set of available secondary transforms when the first codeword has the value indicating that the DCT-2 primary transform is to be applied to the current block; and
- apply the DCT-2 primary transform and the secondary transform during coding of residual data for the current block.

37. The non-transitory computer-readable storage medium of claim 36, wherein the second codeword comprises a value for a low-frequency non-separable transform (LFNST) syntax element.

38. The non-transitory computer-readable storage medium of claim 36,
- wherein the instructions that cause the processor to code the second codeword comprise instructions that cause the processor to decode the second codeword; and
- wherein the instructions that cause the processor to apply the DCT-2 primary transform and the secondary transform comprise instructions that cause the processor to:
  - apply the secondary transform to decoded transform coefficients to produce intermediate transform coefficients; and
  - apply the DCT-2 primary transform to the intermediate transform coefficients to produce a residual block for the current block.

39. The computer-readable storage medium of claim 36, wherein the instructions that cause the processor to determine that the first codeword has the value indicating that the DCT-2 primary transform is to be applied to the current block comprise instructions that cause the processor to determine that the first codeword has a value of zero.

* * * * *